United States Patent
Enomoto et al.

(10) Patent No.: US 8,913,380 B2
(45) Date of Patent: Dec. 16, 2014

(54) DOCKING STATION AND ELECTRONIC DEVICE

(75) Inventors: Minoru Enomoto, Higashiyamato (JP); Yoshinori Kohmoto, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 104 days.

(21) Appl. No.: 13/417,107

(22) Filed: Mar. 9, 2012

(65) Prior Publication Data
US 2012/0275107 A1 Nov. 1, 2012

(30) Foreign Application Priority Data
Apr. 28, 2011 (JP) ................................ 2011-101741

(51) Int. Cl.
*G06F 1/16* (2006.01)
(52) U.S. Cl.
CPC ............ *G06F 1/1632* (2013.01); *G06F 1/1626* (2013.01)
USPC .................................................... 361/679.41
(58) Field of Classification Search
CPC ............................ G06F 1/1632; G06F 1/1626
USPC ..................................................... 361/679.41
See application file for complete search history.

(56) References Cited

U.S. PATENT DOCUMENTS

| | | | | |
|---|---|---|---|---|
| 5,408,382 | A * | 4/1995 | Schultz et al. ............ | 361/679.41 |
| 5,774,332 | A * | 6/1998 | Ruch et al. ............... | 361/679.41 |
| 6,208,508 | B1 * | 3/2001 | Ruch et al. ............... | 361/679.55 |
| 6,856,506 | B2 * | 2/2005 | Doherty et al. ........... | 361/679.27 |
| 6,914,197 | B2 * | 7/2005 | Doherty et al. ............... | 174/254 |
| 7,025,274 | B2 * | 4/2006 | Solomon et al. .......... | 235/472.01 |
| 7,349,206 | B2 * | 3/2008 | Lin et al. .................. | 361/679.41 |
| 7,492,579 | B2 * | 2/2009 | Homer et al. ............. | 361/679.41 |
| 7,542,052 | B2 * | 6/2009 | Solomon et al. ............... | 345/659 |
| 7,911,779 | B1 * | 3/2011 | Tarnoff ..................... | 361/679.43 |
| 7,940,522 | B2 * | 5/2011 | Solomon et al. .......... | 361/679.41 |

(Continued)

FOREIGN PATENT DOCUMENTS

| | | |
|---|---|---|
| JP | 04-006935 | 1/1992 |
| JP | 04-074209 | 3/1992 |

(Continued)

OTHER PUBLICATIONS

Office Action received in Japanese Patent Application No. 2011-101741, mailed Jun. 12, 2012.

(Continued)

*Primary Examiner* — Lisa Lea Edmonds
(74) *Attorney, Agent, or Firm* — Knobbe Martens Olson & Bear LLP

(57) ABSTRACT

According to one embodiment, a docking station includes: a first support; a second support; a second connector; a cover; and a second mark. The first support supports a second face of an electronic device so that a display screen of the electronic device is positioned in an inclined manner. The second support supports a side portion of the electronic device in the state. The second connector is exposed outward from an area positioned in the second support, and to be connectable to a first connector of the electronic device in the state. The cover covers at least a part of the first face in the state. The second mark is capable of being a guide corresponding to the first mark. The second mark guidably indicates to the operator to move the electronic device to a position at which the electronic device is connected while the display screen is inclined.

8 Claims, 17 Drawing Sheets

(56) References Cited

U.S. PATENT DOCUMENTS

| | | | |
|---|---|---|---|
| 8,077,454 B2* | 12/2011 | Ward et al. | 361/679.41 |
| 2004/0039862 A1* | 2/2004 | Hunt et al. | 710/304 |
| 2005/0162824 A1* | 7/2005 | Thompson | 361/686 |
| 2005/0207112 A1* | 9/2005 | Bakker et al. | 361/686 |
| 2005/0213298 A1* | 9/2005 | Doherty et al. | 361/683 |
| 2005/0270731 A1* | 12/2005 | Yin | 361/681 |
| 2006/0061958 A1* | 3/2006 | Solomon et al. | 361/686 |
| 2006/0221565 A1* | 10/2006 | Doherty et al. | 361/683 |
| 2007/0263348 A1* | 11/2007 | Rutledge et al. | 361/681 |
| 2008/0278899 A1* | 11/2008 | Hotelling et al. | 361/683 |
| 2009/0168336 A1* | 7/2009 | Yokote et al. | 361/679.55 |
| 2009/0187677 A1* | 7/2009 | Hunt et al. | 710/14 |
| 2011/0069445 A1* | 3/2011 | Haren et al. | 361/679.44 |
| 2011/0075349 A1* | 3/2011 | Ma et al. | 361/679.41 |
| 2013/0161460 A1* | 6/2013 | Switky et al. | 248/205.8 |

FOREIGN PATENT DOCUMENTS

| | | |
|---|---|---|
| JP | H04-108218 U | 9/1992 |
| JP | H04-127670 U | 11/1992 |
| JP | 08-106341 | 4/1996 |
| JP | 10-289751 | 10/1998 |
| JP | H11-053052 A2 | 2/1999 |
| JP | 2001-015209 A2 | 1/2001 |
| JP | 2003-086272 | 3/2003 |
| JP | 2004-065767 | 3/2004 |
| JP | 2007-066792 | 3/2007 |
| JP | 2007-172513 | 7/2007 |
| JP | 2008-046161 | 2/2008 |
| JP | 2009-157569 | 7/2009 |
| JP | 2010-287144 | 12/2010 |
| JP | 2012234311 A * | 11/2012 |

OTHER PUBLICATIONS

Office Action received in Japanese Patent Application No. 2011-101741, mailed Sep. 25, 2012.

* cited by examiner

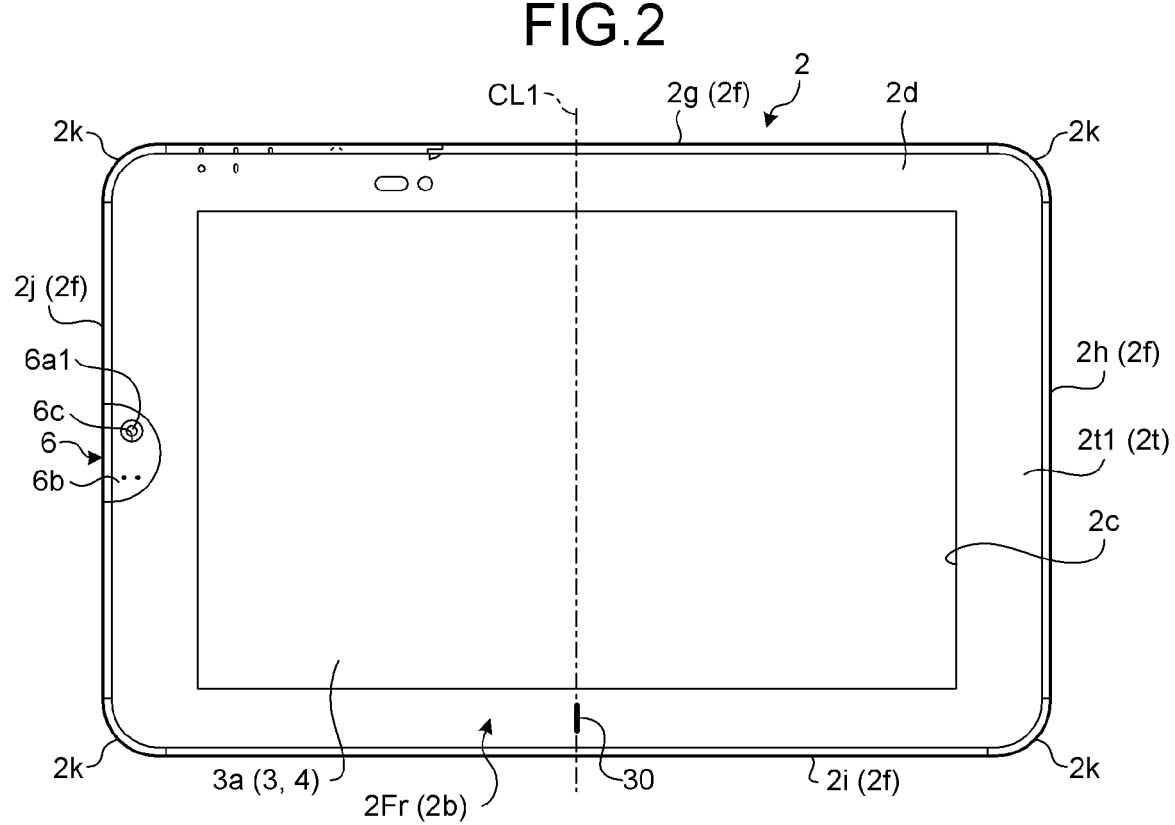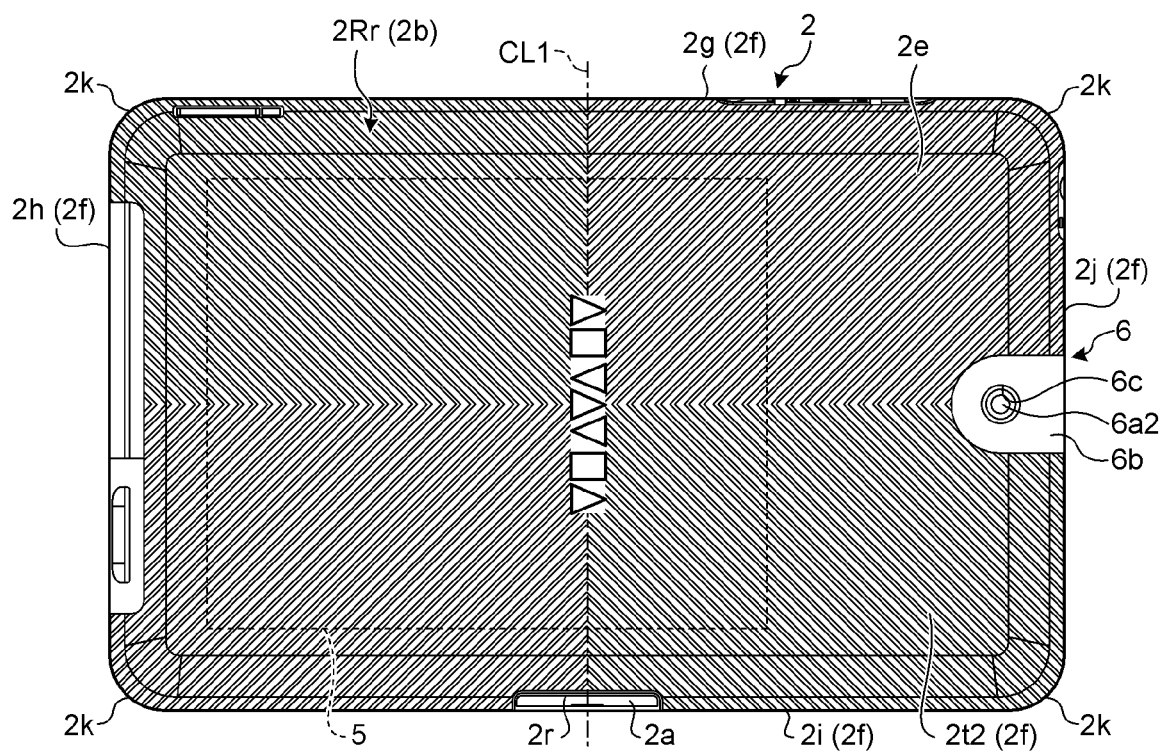

DOCKING STATION AND ELECTRONIC DEVICE

CROSS-REFERENCE TO RELATED APPLICATIONS

This application is based upon and claims the benefit of priority from Japanese Patent Application No. 2011-101741, filed Apr. 28, 2011, the entire contents of which are incorporated herein by reference.

FIELD

Embodiments described herein relate generally to a docking station and an electronic device.

BACKGROUND

Conventionally, there is known a docking station comprising a connector connected to a connector of an electronic device such as a personal computer, and holding the electronic device with the connectors connected to each other.

In such docking station, it is desired to more easily or more accurately move the electronic device to a position where the connectors of the docking station and the electronic device are connected to each other.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 2 is an exemplary front view of the electronic device illustrated in FIG. 1 in the first embodiment;

FIG. 3 is an exemplary back view of the electronic device illustrated in FIG. 1 in the first embodiment;

DETAILED DESCRIPTION

In general, according to one embodiment, a docking station comprises: a first support; a second support; a second connector; a cover; and a second mark. The first support is configured to support, with respect to an electronic device comprising: a housing configured to house a display device comprising a display screen; a first face provided with a first mark to be a guide for indicating to an operator a position at which the housing is connected; a second face on an opposite side of the first face; a side portion laying between the first face and the second face; and a first connector provided to the side portion, the second face so that the display screen is positioned in an inclined manner. The second support is configured to support the side portion of the electronic device in a state in which the first support supports, with respect to the electronic device, the second face so that the display screen is positioned in the inclined manner. The second connector is configured to be exposed outward from an area positioned in the second support, and to be connectable to the first connector of the electronic device in the state in which the display screen is inclined. The cover is configured to cover at least a part of the first face in a state in which the first support supports, with respect to the electronic device, the second face so that the display screen is positioned in the inclined manner. The second mark is configured to be capable of being a guide corresponding to the first mark, the second mark guidably indicating to the operator to move, upon moving the electronic device to the position at which the electronic device is connected while the display screen is inclined, the electronic device to the position at which the electronic device is connected while the display screen is inclined.

Embodiments below comprise components similar to each other. Therefore, in the description below, common numerals refer to similar components, and the explanation thereof will be omitted.

A docking station 1 according to a first embodiment, by connecting an electronic device 2 thereto, can increase the number of connectors originally provided to the electronic device 2, expand functions originally provided to the electronic device 2, and add a function not originally being provided to the electronic device 2. In other words, the docking station 1 is an example of a function expansion device for the electronic device 2.

Figure 1:
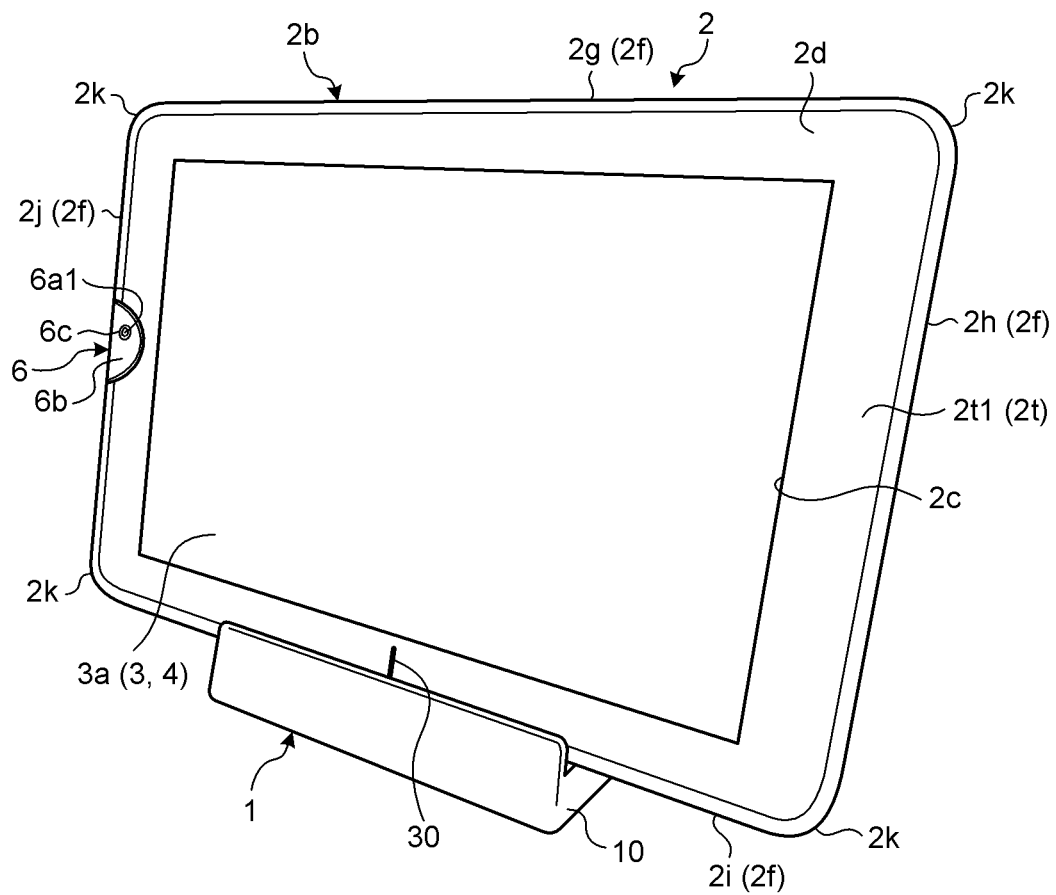
FIG. 1 is an exemplary perspective view of a docking station and an electronic device connected to the docking station according to a first embodiment.

As illustrated in FIG. 1, the docking station 1 according to the present embodiment supports the relatively thin and flat shaped electronic device 2 while the electronic device 2 stands up. In other words, the docking station 1 is an example of a supporting device, a holding device, a supporting stand, a support, a setting stand, and a holder for the electronic device 2.

Figure 5:
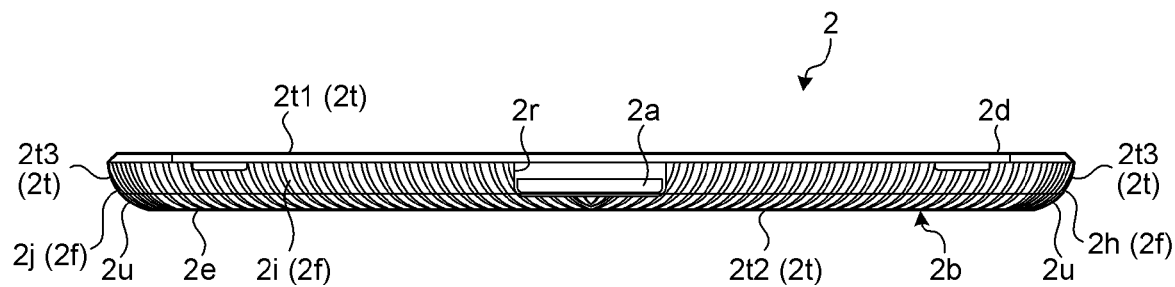
FIG. 5 is another exemplary side view of the electronic device illustrated in FIG. 1 in the first embodiment.

The docking station 1 comprises a connector (connection area) 1a (see FIGS. 6, 7, and the like) connected to a connector (connection area) 2a of the electronic device 2 (see FIG. 5 and the like). The docking station 1 supports the electronic device 2 with the connector 1a and the connector 2a being connected to each other.

In addition to the connector 1a, the docking station 1 further comprises a connector 1b (see FIG. 8 and the like) connected to a connector (external connector) other than the connector 2a of the electronic device 2. In other words, the docking station 1 is an example of an intervening device that intervenes between the electronic device 2 and a third electronic device or the like (not illustrated).

As described above, because the docking station 1 functions as a function expansion device, a connection device, an intervening device, and the like, a housing 10 of the docking station 1 houses (contains), in addition to the connectors 1a and 1b, a circuit board (printed wiring board) 11, an electronic component 12, an electrical component 13, a wiring 14, and the like (refer to FIG. 10 and other figures) as modules and components. In other words, the docking station 1 is also an example of an electronic device (first electronic device), an electrical device, and a device.

In the present embodiment, as illustrated in FIGS. 2 to 5 and the like, the electronic device 2 is a personal computer, a television, a smartphone, a mobile phone, and the like, of a slate-type, a tablet-type, a display device comprising a function of a software keyboard, and the like. The electronic device 2 is an example of a second electronic device, another electronic device, and an external device.

A housing 2b of the electronic device 2 comprises a front wall 2d (a first wall, a first portion, or a first area) on which an opening 2c is provided, a rear wall (a second wall, a second portion, or a second area) 2e arranged on the opposite side of the front wall 2d in a manner approximately parallel to the front wall 2d, and a side wall (a third wall, a third portion, or a third area) 2f laying between the front wall 2d and the rear wall 2e. The front wall 2d and the rear wall 2e are in oblong shapes (e.g., rectangular shapes). The housing 2b is in a flat rectangular-parallelepiped shape. The front wall 2d is an example of a wall, a first wall, and a front wall. The rear wall 2e is an example of the wall, a second wall, and a rear wall. The side wall 2f is an example of the wall, a third wall, a standing wall, a peripheral wall, and an end wall. The housing 2b can be formed by combining a plurality of components (divided parts). As illustrated in FIGS. 2 and 3, for example, the housing 2b comprises a first portion 2Fr comprising at least the front wall 2d and a second portion 2Rr comprising at least the rear wall 2e. The side wall 2f is contained in at least the first portion 2Fr and the second portion 2Rr (in the present embodiment, in the second portion 2Rr, for example).

The housing 2b comprises four sides (ends, side portions, or edges) 2g, 2h, 2i, and 2j, and four corners 2k. The sides 2g and 2i are an example of a long side, and the sides 2h and 2j are an example of a short side. In the present embodiment, for example, the electronic device 2 is supported by the docking station 1 so that: the sides 2g and 2i, which are the long sides, extends in a lateral direction; and the sides 2h and 2j, which are the short sides, extends in a longitudinal direction. In other words, the electronic device 2 is supported by the docking station 1 so as to be horizontally elongated. The connector 2a of the electronic device 2 is arranged in an opening 2r provided to the side wall 2f serving as a part of the side (first side) 2i, and is exposed from the opening 2r. The connector 1a of the docking station 1 (refer to FIGS. 6, 7, and other figures) enters into the housing 2b from the opening 2r, and is connected to the connector 2a. As illustrated in FIG. 1, the docking station 1 supports or holds at least a part of the side 2i of the housing 2b of the electronic device 2. In the present embodiment, for example, the docking station 1 supports (holds) the center of the side 2i surrounding the side wall 2f, the front wall 2d (refer to FIGS. 1 and 2), and the rear wall 2e (refer to FIG. 3) from the outside in an approximately U-shaped manner.

The housing 2b houses a display panel 3 in a flat rectangular-parallelepiped shape as a display module. A display screen 3a of the display panel 3 is exposed from the opening 2c of the front wall 2d. The display panel 3 is an example of a display device, a display module, a module, a panel, and an electronic component. The display panel 3, for example, is a liquid crystal display (LCD) or an organic electro-luminescent display (OLED). On the front side of the display panel 3, a transparent and relatively thin input operation panel (e.g., touch panel) 4 is provided as an input module. The input operation panel 4 covers the display screen 3a serving as the front surface (surface) of the display panel 3. An operator (user), for example, touches, presses, or rubs the input operation panel 4 with a finger or a stylus, or moves the finger or the stylus near the input operation panel 4, thereby performing an input operation. Light output from the display screen 3a of the display panel 3 passes through the input operation panel 4, and comes out of the electronic device 2 from the opening 2c.

Figure 6:
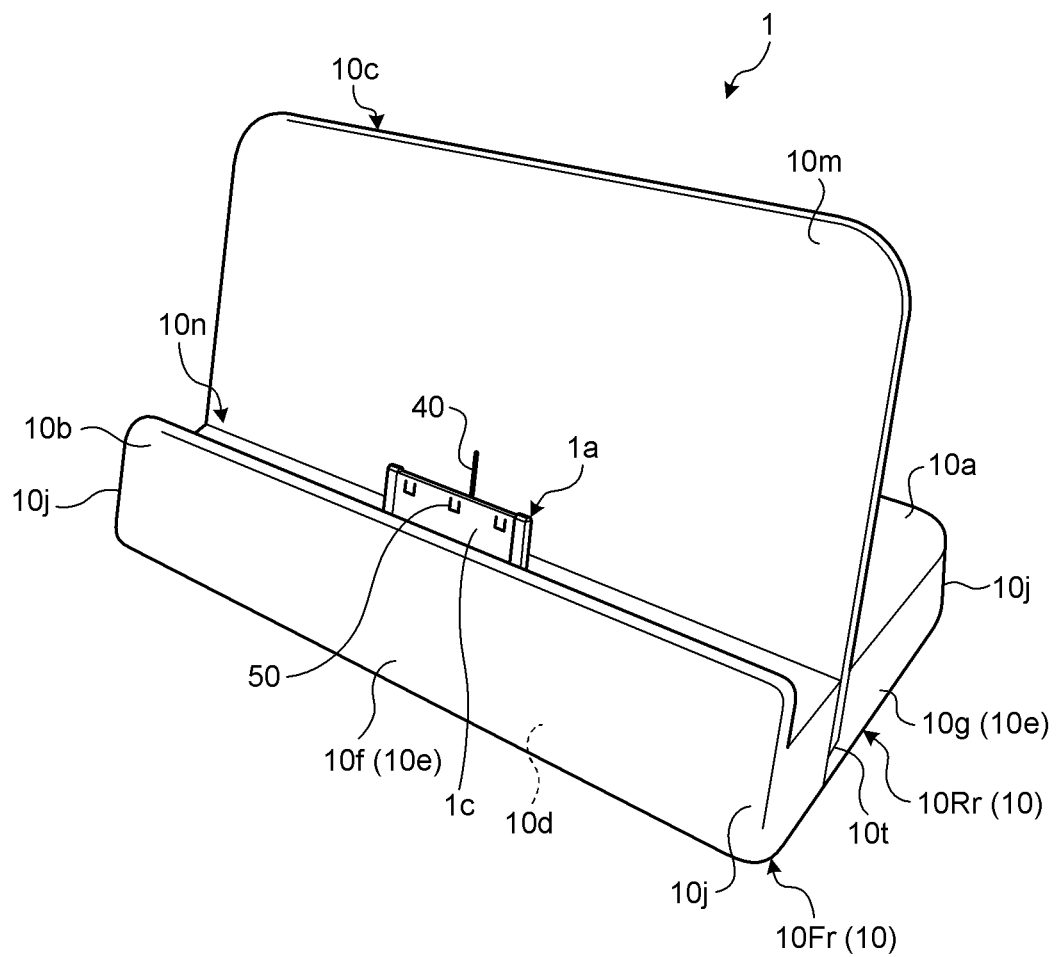
FIG. 6 is an exemplary perspective view of the docking station illustrated in FIG. 1 in the first embodiment.

In addition to the connector 2a, the housing 2b houses a circuit board (printed wiring board), an electronic component, an electrical component, wiring, and the like (none of them illustrated) as modules and components, on the opposite side (back side) of the display panel 3. The housing 2b further houses (contains) a battery pack (a charging module, a battery module, a battery, or a rechargeable battery) 5 as an electrical component. As illustrated in FIG. 3, the battery pack 5 is in a flat shape (e.g., a rectangular plate-shape), and is provided in a manner arranged along the front wall 2d and the rear wall 2e, and in a manner traversing, in the longitudinal direction, a center line CL1 positioned at the center of the housing 2b of the electronic device 2 in the longitudinal direction and extending along the lateral direction. With this configuration, compared with the housing where the battery pack 5 is arranged closer to one side with respect to the center line CL1, the docking station 1 can easily keep balance on both sides of the center line CL1 when supporting the electronic device 2. As illustrated in FIGS. 3, 5, and the like, the connector 2a of the electronic device 2 is positioned at the center of the side 2i or the vicinity thereof. Further, as illustrated in FIG. 6, the connector 1a of the docking station 1 is positioned at the center in a direction along the side 2i or the vicinity thereof in the docking station 1. This makes it possible to reduce load to the connectors 1a and 2a due to weight of the electronic device 2 or other factors.

Figure 4:
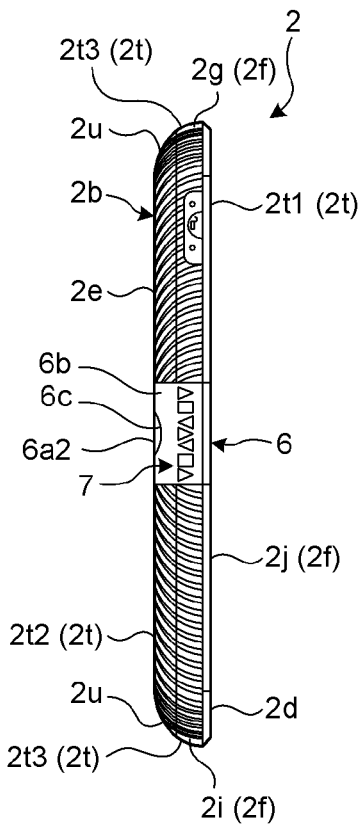
FIG. 4 is an exemplary side view of the electronic device illustrated in FIG. 1 in the first embodiment.

As illustrated in FIGS. 2 to 4, in the present embodiment, a camera module 6 comprising a camera 6a is provided on the side 2j of the electronic device 2, for example. The camera module (an imager, an imaging module, an image receiver, a receiver) comprises a cover 6b, a camera 6a1 on the front surface, and a camera 6a2 on the rear surface, for example. The cameras 6a1 and 6a2 are exposed from an opening 6c provided to the cover 6b. The camera module 6, for example, is arranged at a position in the center in the lateral direction of the housing 2b at the side 2j different from the side 2i supported by the docking station 1. The camera module 6 is exposed while the electronic device 2 is supported by the docking station 1. In the present embodiment, by changing a material, painting, surface treatment, and the like for the cover 6b from those for the housing 2b, difference in appearance (colors, patterns, reflection of light, or other elements) between the housing 2b and the cover 6b is made large, thereby further emphasizing the camera module 6. For example, while the surface of the housing 2b is painted in black or white, plate processing is performed on the surface of the cover 6b to add a metallic luster in silver, thereby making it possible to form the surface in a mirror-surface state. Furthermore, as illustrated in FIG. 4, in the present embodiment, a logo (a logo type, a character string, and a design) 7 indicating a brand name, such as a product, a service, a manufacturer, and a supplier, and a design is provided on the surface (a part of a side surface 2t3 of the housing 2b) of the cover 6b, for example. The logo 7 can be provided by putting a ticker, or printing on the surface of the cover 6b, for example. Such a configuration makes it possible to emphasize the logo 7 together with the camera module 6. Furthermore, the space for the camera module 6 can be commonly used for the space for emphasizing the logo 7, whereby it is possible to use the space of a surface 2t of the electronic device 2 more efficiently. In addition, there is an advantage in that the cover 6b of the camera module 6 is smaller than the housing 2b, and is provided with the logo 7 by printing or the like in a simple manner compared with the housing 2b. The camera module 6 is an example of a module. Note that, in FIG. 4, the logo (7 or the like) is schematically illustrated in a manner comprising a symbol or the like.

As illustrated in FIGS. 6 to 9, the docking station 1 comprises the housing 10, a first protruding portion 10b and a second protruding portion 10c that protrude from an upper wall 10a of the housing 10. The housing 10 comprises the upper wall 10a, a lower wall 10d arranged on the opposite side of the upper wall 10a in manner approximately parallel to the upper wall 10a, and a side wall 10e laying between the upper wall 10a and the lower wall 10d. The upper wall 10a and the lower wall 10d are in oblong shapes (e.g., rectangular shapes). The housing 10 is in a flat rectangular-parallelepiped shape. The upper wall 10a is an example of a wall, a first wall, and a front wall. The lower wall 10d is an example of the wall, a second wall, and a rear wall. The side wall 10e is an example of the wall, a third wall, a standing wall, a peripheral wall, and an end wall. In the present embodiment, for example, the first protruding portion 10b is integrated into (a first portion 10Fr of) the housing 10, and the second protruding portion 10c is formed as an independent member from the housing 10. The housing 10, the first protruding portion 10b, the second protruding portion 10c, and the like can be formed of a synthetic resin material, a metal material, and the like.

The housing 10 comprises four sides (ends, side portions, or edges) 10f, 10g, 10h, and 10i, and four corners 10j viewed from a normal direction of the upper wall 10a. The first protruding portion 10b protrudes from the side 10f on the front side. By contrast, the second protruding portion 10c protrudes from a position separated away from the side 10f to the side 10h side (rear side) opposite thereto with a space interposed therebetween. A rear surface (surface) 10k of the first protruding portion 10b and a front surface (surface) 10m of the second protruding portion 10c are arranged in a manner approximately parallel to each other. Furthermore, in the present embodiment, the first protruding portion 10b and the second protruding portion 10c are in wall-shapes (plate-shapes), for example. Therefore, the first protruding portion 10b and the second protruding portion 10c are arranged in a manner approximately parallel to each other.

As described above, the docking station 1 supports the side 2i of the electronic device 2. In other words, as is clear by referring to FIGS. 1, 6, 9, and the like, the first protruding portion 10b, the second protruding portion 10c, and the upper wall 10a of the housing 10 of the docking station 1 surround the side 2i from outside. In the present embodiment, the first protruding portion 10b covers a part of a front surface (a first face, a first area, or a first portion) 2t1 serving as the surface 2t of the front wall 2d of the electronic device 2. The second protruding portion 10c covers a part of a rear surface (a second face, a second area, or a second portion) 2t2 serving as the surface 2t of the rear wall 2e of the electronic device 2. The upper wall 10a of the housing 10 covers a part of the side surface (a third surface, a third area, or a third portion) 2t3 serving as the surface 2t of the side wall 2f of the electronic device 2. Therefore, the first protruding portion 10b, the second protruding portion 10c, and the upper wall 10a are examples of a cover that covers at least a part of the electronic device 2. In the present embodiment, the first protruding portion 10b, the second protruding portion 10c, and a joining portion 10a1 positioned between the first protruding portion 10b and the second protruding portion 10c on the upper wall 10a constitute a concave portion 10n. Therefore, the joining portion 10a1 of the upper wall 10a is an example of a bottom portion or a lower portion of the concave portion (slot portion) 10n that supports the side 2i of the electronic device 2.

Figure 9:
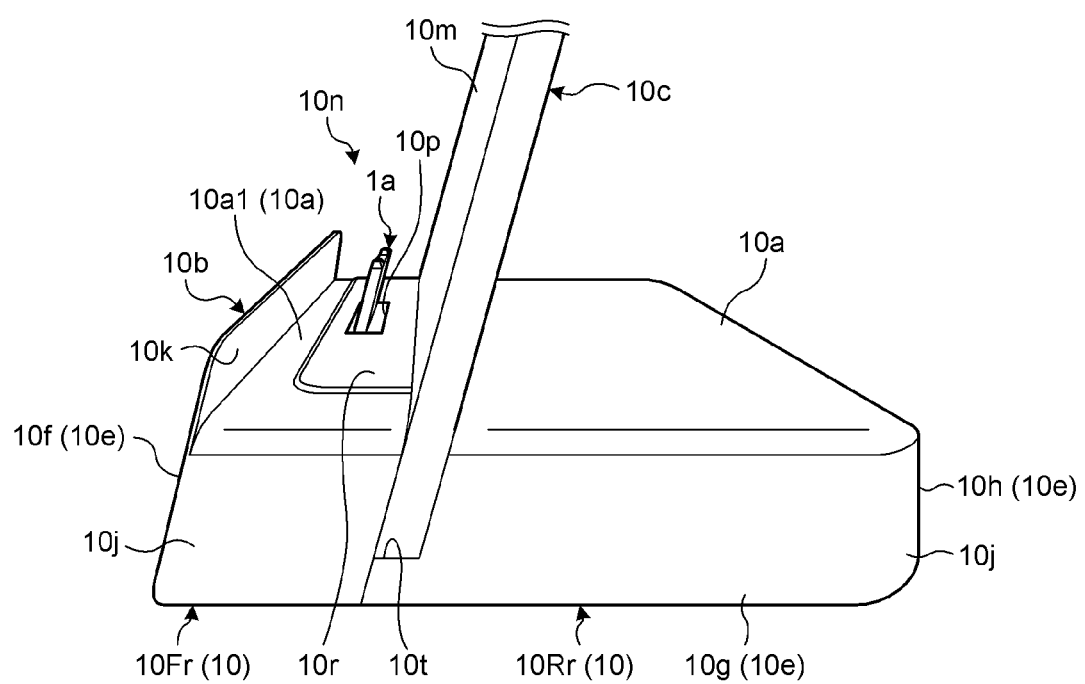
FIG. 9 is an exemplary perspective view of the docking station illustrated in FIG. 1 viewed from a side thereof, in the first embodiment.

As illustrated in FIG. 9, the first protruding portion 10b and the second protruding portion 10c are slightly inclined rearward. In other words, the first protruding portion 10b and the second protruding portion 10c protrude upward while being inclined rearward, that is, being inclined in a direction from the side 10f to the side 10h. Therefore, in a state where the electronic device 2 is supported by the docking station 1, the rear surface 2t2 of the electronic device 2 on which gravity acts comes into contact with the second protruding portion 10c, and the side surface 2t3 (side 2i) of the electronic device 2 on which gravity acts comes into contact with the upper wall 10a. In other words, in the present embodiment, the second protruding portion 10c is an example of a first support (first portion) that supports the rear surface 2t2 of the electronic device 2, and the upper wall 10a is an example of a second support (second portion) that supports the side surface 2t3 (side 2i) of the electronic device 2. Furthermore, the first protruding portion 10b may prevent the side 2i of the electronic device 2 from moving forward. In this housing, the first protruding portion 10b is an example of a third support (third portion) that supports the front surface 2t1 (side 2i) of the electronic device 2.

The second protruding portion 10c protrudes higher than the first protruding portion 10b. Therefore, the operator (user or the like) can slide the rear surface 2t2 of the electronic device 2 along the front surface 10m of the second protruding portion 10c when putting the electronic device 2 on the docking station 1. In other words, the second protruding portion 10c is an example of a guide. Furthermore, as illustrated in FIGS. 4, 5, and other figures, a boundary portion 2u between the rear surface 2t2 and the side surface 2t3 of the electronic device 2 is chamfered roundly. In other words, the side surface 2t3 and the boundary portion 2u are formed curvedly, and continue smoothly. Therefore, the operator (user or the like) brings the side surface 2t3 of the electronic device 2 into contact with the front surface 10m of the second protruding portion 10c, and slides the side surface 2t3 along the second protruding portion 10c when putting the electronic device 2 on the docking station 1. As a result, the operator (user or the like) can move the electronic device 2 relatively smoothly from the state where the side surface 2t3 comes into contact with the front surface 10m of the second protruding portion 10c to the state where the rear surface 2t2 comes into contact with the front surface 10m of the second protruding portion 10c. Accordingly, the operator (user or the like) can insert the electronic device 2 into the concave portion 10n in a relatively simple manner, and causes the electronic device 2 to be supported by the docking station 1.

As illustrated in FIGS. 6, 9, and the like, the connector 1a protrudes from the joining portion 10a1 (upper wall 10a) between the first protruding portion 10b and the second protruding portion 10c. In other words, the connector 1a is arranged in the concave portion 10n. Furthermore, the connector 1a protrudes in a manner parallel to the rear surface 10k of the first protruding portion 10b and the front surface 10m of the second protruding portion 10c. As illustrated in FIG. 9, the connector 1a protrudes outside from inside of the housing 10 through an opening 10p provided to the joining portion 10a1 (upper wall 10a). Furthermore, a buffer 10r comprising an elastic body, such as a rubber and a sponge, is provided around the connector 1a in the joining portion 10a1 (upper wall 10a). The buffer 10r can prevent the side surface 2t3 and the side 2i from being subject to impact when the electronic device 2 is supported by (connected to) the docking station 1.

Figure 7:
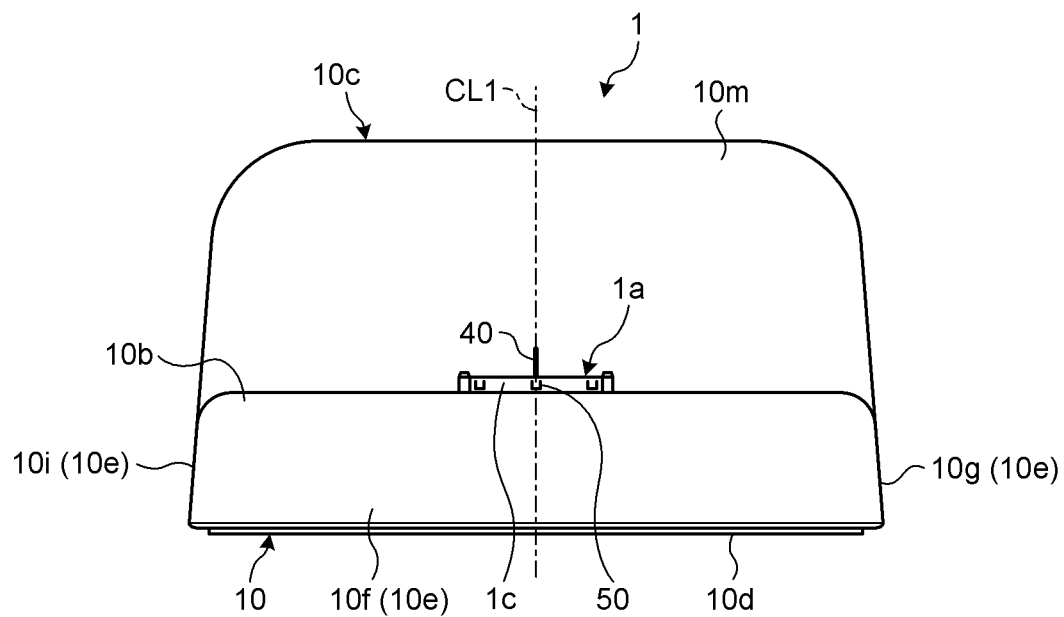
FIG. 7 is an exemplary front view of the docking station illustrated in FIG. 1 in the first embodiment.

As illustrated in FIG. 7, the connector 1a is positioned at the center in a horizontal direction (that is, a direction along the side 2i of the electronic device 2) viewed from the front. Furthermore, the connector 1a protrudes higher than the first protruding portion 10b. As a result, when causing the electronic device 2 to be supported by (connected to) the docking station 1, the operator (user or the like) can move the electronic device 2 to a predetermined supporting position (connection position) in a simple manner while visually confirming the connector 1a, and using the connector 1a as a target. Between the docking station 1 and the electronic device 2, for example, electricity from the power supply, various types of data, an image signal, and an audio signal are transmitted via (a terminal of) the connector 1a and (a terminal of) the connector 2a.

Figure 8:
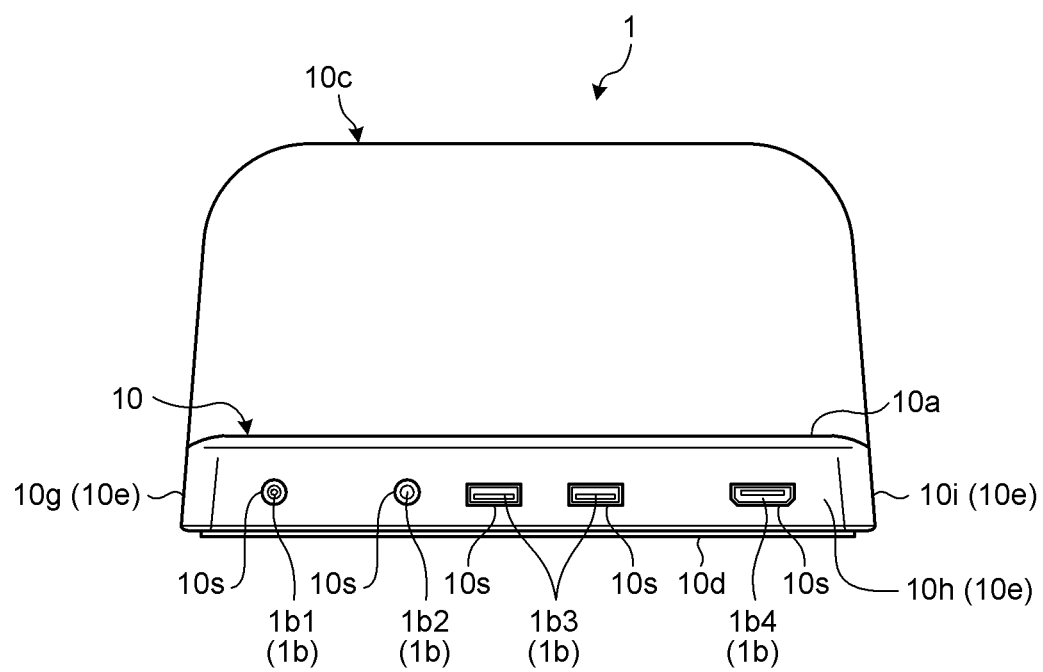
FIG. 8 is an exemplary back view of the docking station illustrated in FIG. 1 in the first embodiment.

As illustrated in FIG. 8, openings 10s are provided to the side wall 10e on the rear side of the housing 10. The connectors 1b are exposed from the openings 10s. As the connector 1b, for example, a connector for electricity from a power supply 1b1, a connector for an audio signal 1b2, a connector for data 1b3, and a connector for an image signal 1b4 can be provided. The positions of these connectors 1b are not limited to the rear portion of the housing 10, and can be in the front portion, the side portion, the upper portion, and the like.

The housing 10 can be formed by combining a plurality of components (divided parts). As illustrated in FIG. 9, for example, the housing 10 comprises the first portion 10Fr before the second protruding portion 10c and a second portion 10Rr after the second protruding portion 10c. The second protruding portion 10c is inserted into a concave portion 10t formed in a boundary portion between the first portion 10Fr and the second portion 10Rr, and is sandwiched between the first portion 10Fr and the second portion 10Rr.

Figure 10:
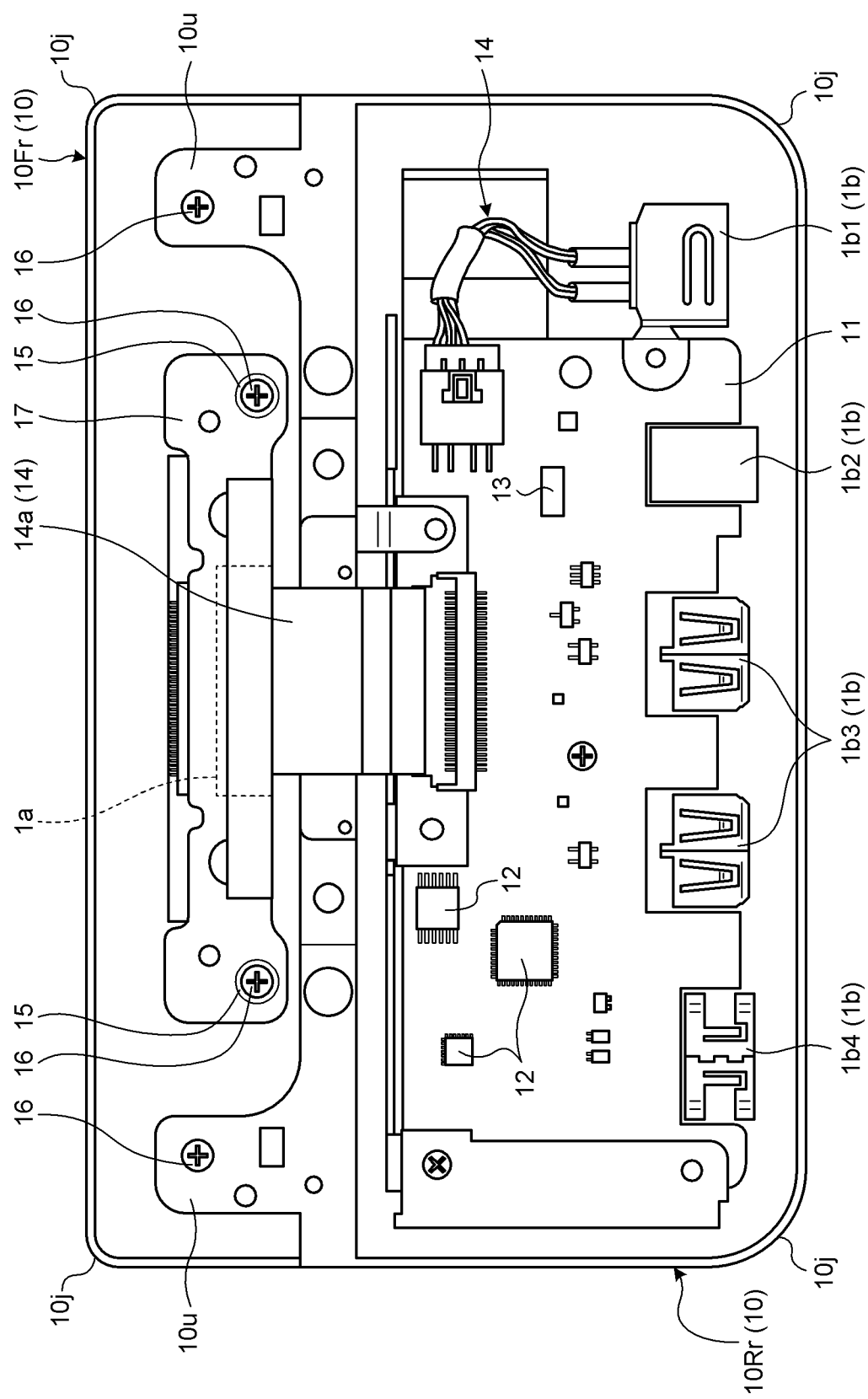
FIG. 10 is an exemplary plan view (bottom view) of a configuration inside a housing of the docking station illustrated in FIG. 1 in the first embodiment.

As illustrated in FIG. 10, in the present embodiment, the circuit board 11 is housed in the second portion 10Rr, for example. On the circuit board 11, the electronic component 12, the electrical component 13, the wiring 14, the connectors 1b, and the like are provided. In FIG. 10, a wiring pattern arranged on the circuit board 11 is not illustrated. The connector 1a is connected to the circuit board 11 via a flexible cable 14a having flexibility. The flexible cable 14a can be formed as a flexible printed wiring board and a flat cable, for example. The connector 1a is provided to a circuit board (second circuit board) 17, and is housed in the first portion 10Fr. In the present embodiment, for an example, the connector 1a (circuit board 17) is fixed to the first portion 10Fr (housing 10) with an elastic support 15 having flexibility and elasticity interposed therebetween. The elastic support 15 comprises an elastic body of a rubber, a synthetic resin material, a sponge, and a coil spring, for example, and is fixed to the first portion 10Fr with a fixture such as a screw 16 together with the connector 1a. This makes it possible to draw the connector 1a into the housing 10 elastically from the opening 10p even if the electronic device 2 applies relatively large force and excessively large force to the connector 1a. Therefore, it is possible to prevent the electronic device 2 from applying relatively large force to the connector 1a. Furthermore, as described above, the connector 1a and the circuit board 11 are connected via the flexible cable 14a. Therefore, even if the connector 1a being subject to the force from the electronic device 2 moves up and down, it is possible to maintain the state of (a terminal) of the connector 1a and the circuit board 11 being electrically connected, and to prevent the force applied to the connector 1a from being transmitted to the circuit board 11.

Figure 11:
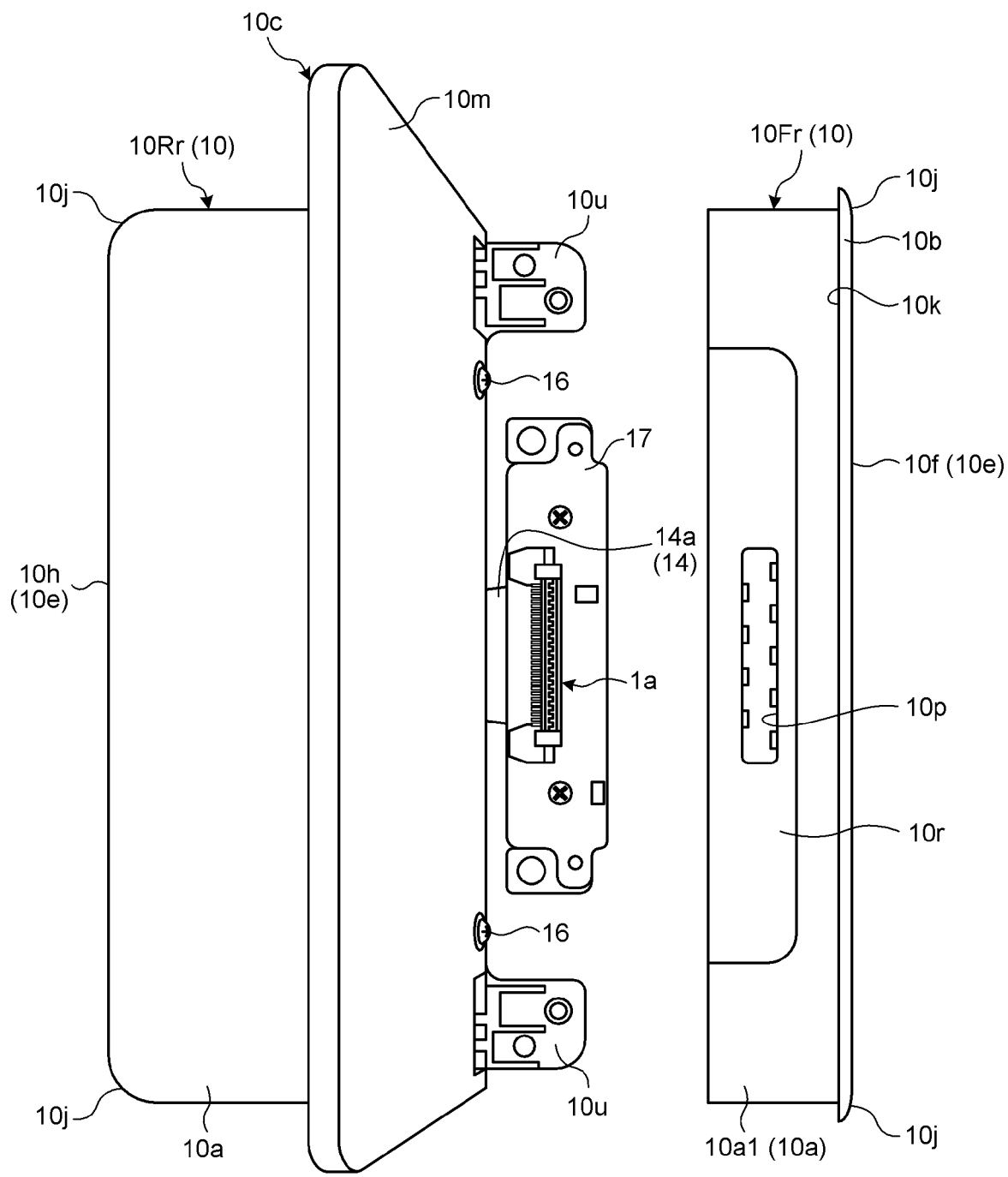
FIG. 11 is an exemplary exploded perspective view of the docking station illustrated in FIG. 1 in the first embodiment.

As illustrated in FIG. 11, in the present embodiment, the second protruding portion 10c is fixed to a boundary portion between the second portion 10Rr and the first portion 10Fr (that is, a front end, or an end) with a fixture such as the screw 16, for example. As illustrated in FIGS. 10 and 11, the first portion 10Fr is fixed to protruding portions 10u that protrude forward (to the first portion 10Fr side) from the second portion 10Rr with a fixture such as the screws 16. The connector 1a protrudes from the opening 10p provided to the upper wall 10a serving as the joining portion 10a1 of the first portion 10Fr. This makes it possible to obtain the configuration in which the second protruding portion 10c protrudes relatively high from the housing 10 as a relatively strong and relatively lightweight configuration.

Figure 12:
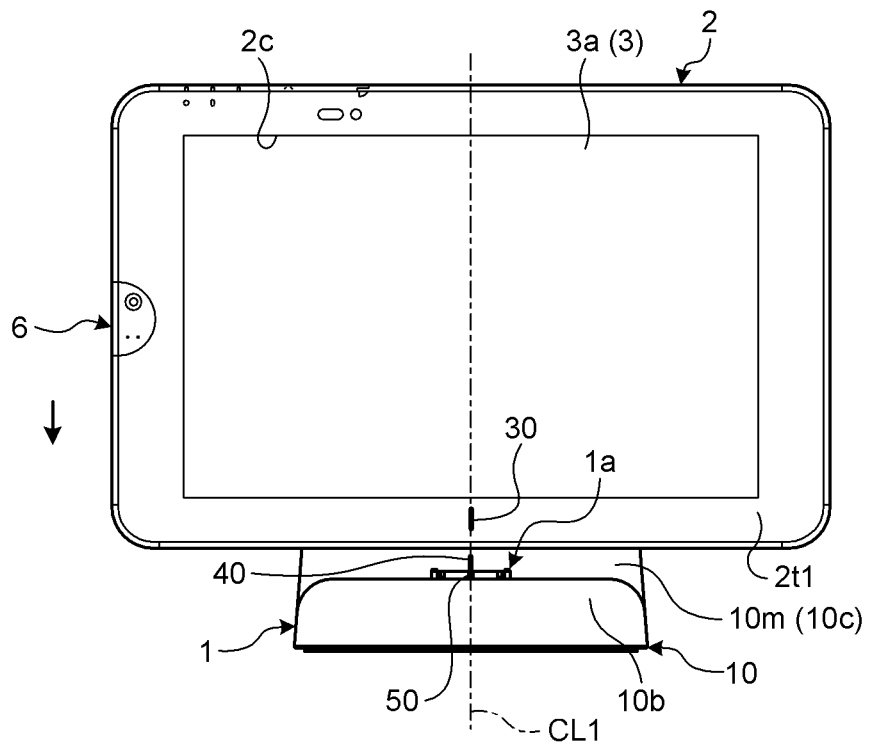
FIG. 12 is an exemplary front view of the electronic device prior to being connected to the docking station in the first embodiment.

As illustrated in FIGS. 12, 2, and the like, in the present embodiment, a mark (a sign, an indicator, a locator, a visual-confirmation area, a design, a confirmation portion, or an introduction portion) 30 to be a guide for positioning with respect to the docking station 1 while the docking station 1 supports (is connected to) the electronic device 2 is provided at the center of the side 2i of the electronic device 2 in the longitudinal direction. The mark 30 is also a guide for indicating the position at which the housing 2b of the electronic device 2 is connected to the docking station 1 to the operator (user or the like). In the present embodiment, for example, the mark 30 is arranged on the front surface 2t1 of the housing 2b as a sign of a line segment extending in a direction of connection of the connectors 1a and 2a (a vertical direction in FIG. 12) by printing. The mark 30 is an example of a first mark and a sign.

As illustrated in FIGS. 12, 6, and the like, in the present embodiment, a mark (a sign, an indicator, a locator, a visual-confirmation area, a design, a confirmation portion, or an introduction portion) 40 to be a guide for positioning with respect to (the mark 30 of) the electronic device 2 while the docking station 1 supports (is connected to) the electronic device 2 is provided to the second protruding portion 10c of the docking station 1. The mark 40 is also a guide for indicating the position at which the housing 2b of the electronic device 2 is connected to the docking station 1 to the operator (user or the like). In the present embodiment, for example, the mark 40 is arranged on the front surface 10m of the second protruding portion 10c as a sign of a line segment or a rectangle extending in the direction of connection of the connectors 1a and 2a by printing. The mark 40 is an example of a second mark and the sign.

Furthermore, as illustrated in FIGS. 12, 6, 7, and the like, in the present embodiment, a mark (a sign, an indicator, a locator, a visual-confirmation area, a design, a confirmation portion, or an introduction portion) 50 to be a guide for positioning with respect to (the mark 30 of) the electronic device 2 while the docking station 1 supports (is connected to) the electronic device 2 is provided to the connector 1a of the docking station 1. The mark 50 is also a guide for indicating the position at which the housing 2b of the electronic device 2 is connected to the docking station 1 to the operator (user or the like). In the present embodiment, for example, the mark 50 is arranged on a front surface 1c of the connector 1a as a spring portion obtained by cutting out a plate-like metal portion (laminate portion) in a U-shaped manner, and causing the portion to protrude with respect to its periphery (cutting the portion to raise). The mark 50 is an example of the second mark and the sign.

Figure 13:
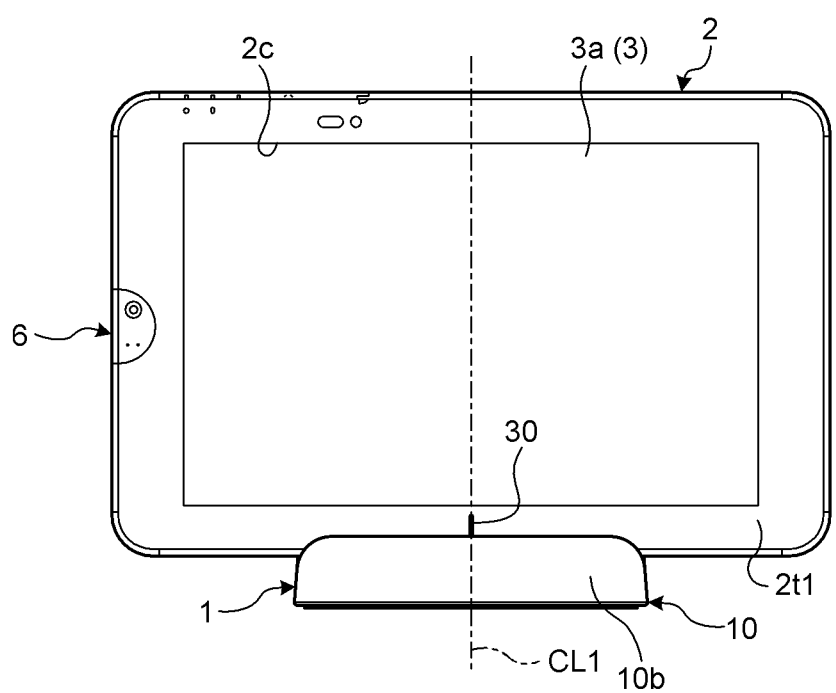
FIG. 13 is an exemplary front view of the electronic device which is connected to the docking station in the first embodiment.

As described above, in the present embodiment, the marks 30, 40, and 50 are provided to the docking station 1 and the electronic device 2. Therefore, according to the present embodiment, for example, the operator (user) can move the electronic device 2 to the supporting position (connection position or a position illustrated in FIG. 13) in the docking station 1 more simply or more accurately while visually confirming the marks 30, 40, and 50 as the guides viewed from the front as illustrated in FIG. 12 with the marks 30, 40, and 50 aligned along a movement direction (a connection direction, a thrusting direction, an inserting direction, a fitting direction, or a vertical direction) of the electronic device 2.

In the present embodiment, the mark 40 serving as the second mark is provided to the second protruding portion 10c serving as the first support. In other words, in the present embodiment, because the mark 40 is provided to the second protruding portion 10c that protrudes, the operator (user) can visually confirm the mark 40 more easily, for example. Furthermore, if the second protruding portion 10c protrudes relatively high (higher than the first protruding portion 10b or the connector 1a), the mark 40 can be arranged at a high position relatively distant from the position at which the connectors 1a and 2a are connected. As a result, for example, when moving the electronic device 2 to the supporting position (connection position) in the docking station 1, the operator (user) can align the electronic device 2 and the docking station 1 at a relatively early stage. Furthermore, for example, the operator (user) can move the electronic device 2 to the supporting position (connection position) in the docking station 1 still more simply or still more accurately.

In the present embodiment, the connector 1a protrudes higher than the first protruding portion 10b serving as the cover. Therefore, according to the present embodiment, for example, the operator (user) can visually confirm the connector 1a more easily. As a result, for example, the operator (user) can easily align the mark 30 and the connector 1a by visual confirmation. Furthermore, for example, the operator (user) can move the electronic device 2 to the supporting position (connection position) in the docking station 1 still more easily or still more accurately.

In the present embodiment, the mark 50 serving as the second mark is provided to the connector 1a. Therefore, according to the present embodiment, for example, the operator (user) can align the electronic device 2 and the docking station 1 by visually confirming the mark 50 of the connector 1a even just before inserting the connector 1a into the electronic device 2. As a result, for example, the operator (user) can move the electronic device 2 to the supporting position (connection position) in the docking station 1 still more simply or still more accurately.

In the present embodiment, the marks 30 and 40 extend along the movement direction (connection direction, thrusting direction, inserting direction, fitting direction, or vertical direction) of the electronic device 2 relative to the docking station 1 when the electronic device 2 is supported by (connected to) the docking station 1. Therefore, in the present embodiment, for example, the operator (user) can easily confirm a proper position and the movement direction of the electronic device 2 relative to the docking station 1. Furthermore, for example, the operator (user) can move the electronic device 2 to the supporting position (connection position) in the docking station 1 still more simply or still more accurately.

Figure 14:
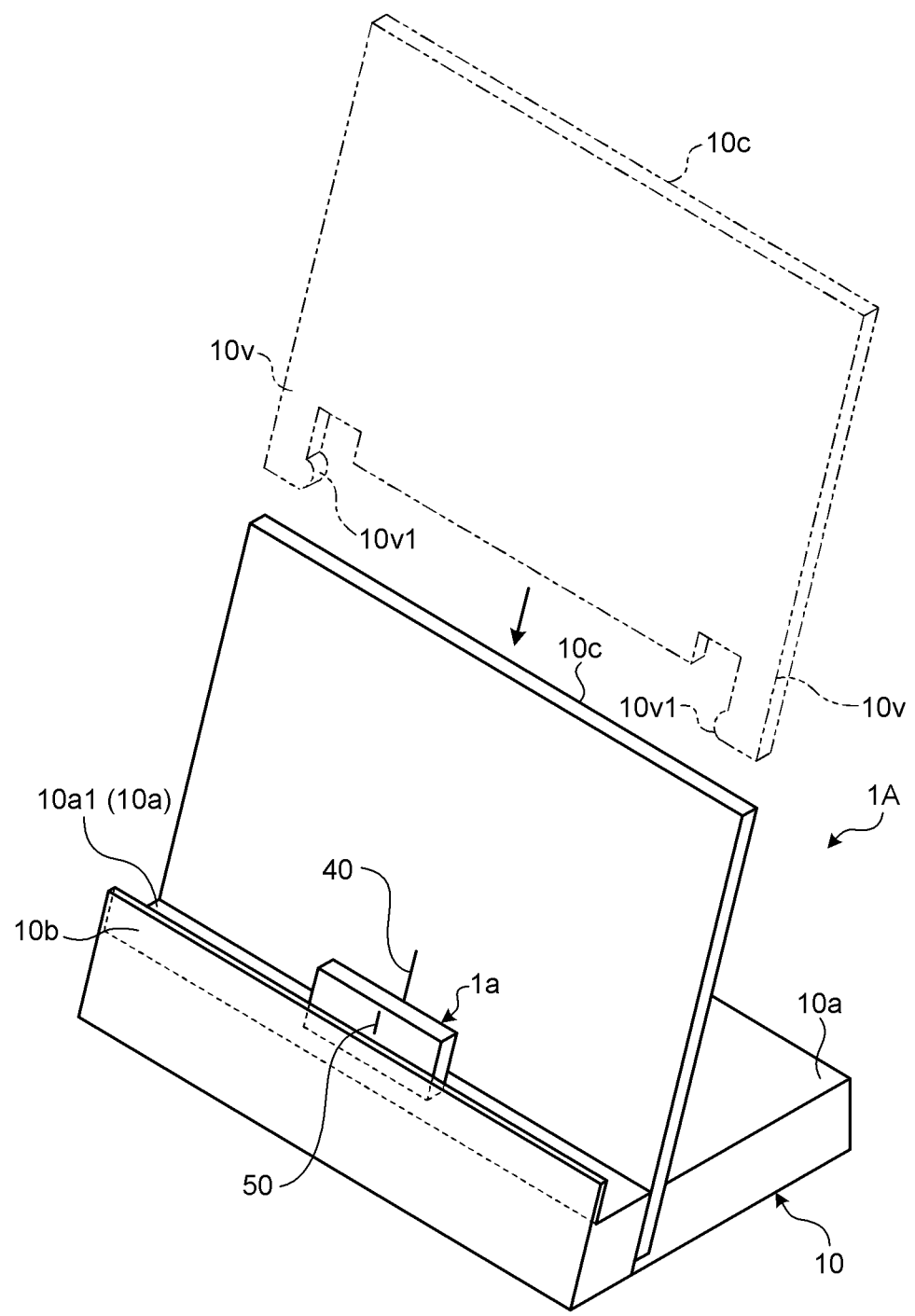
FIG. 14 is an exemplary perspective view of a docking station according to a second embodiment.

A docking station 1A according to a second embodiment illustrated in FIG. 14 has a configuration similar to that of the docking station 1 according to the first embodiment. Therefore, the docking station 1A according to the present embodiment can also provide advantageous effects similar to those of the first embodiment. In the present embodiment, however, the second protruding portion 10c is configured in an elastically detachable manner with respect to the housing 10. Specifically, for example, an elastically transformable protruding portion 10v is provided to a portion inserted into the housing 10 (a lower end or an end) of the second protruding portion 10c. The protruding portion 10v comprises an engaging portion (retaining portion) 10v1 that engages with a part (not illustrated) of the housing 10 in the housing 10, and that prevents the protruding portion 10v, that is, the second protruding portion 10c from moving with respect to the housing 10. According to the present embodiment, for example, the docking station 1A can be disassembled and assembled more simply. As a result, for example, it is possible to make a size of the docking station 1A when being packaged, a size thereof when being transported, and the like small in a simple manner.

Figure 15:
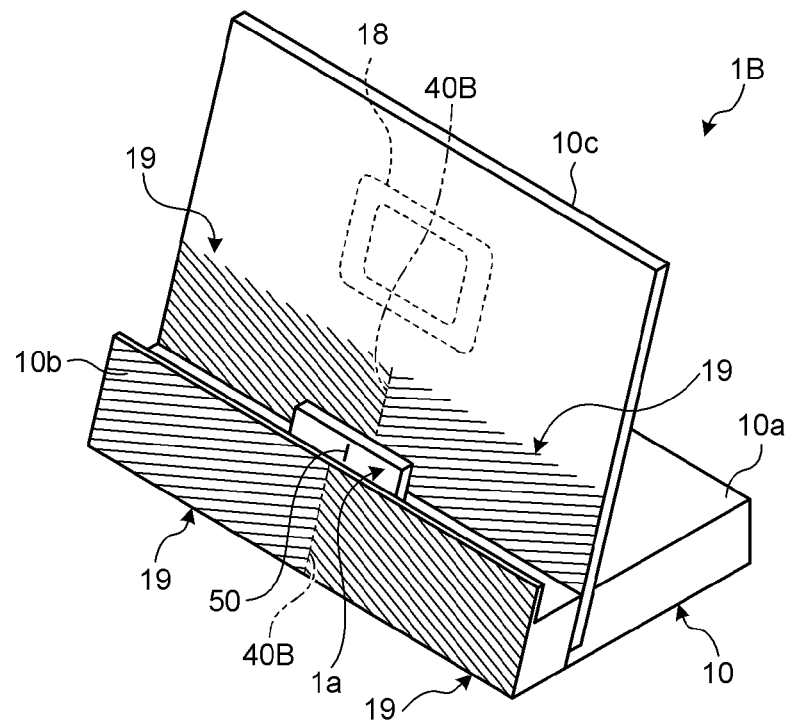
FIG. 15 is an exemplary perspective view of a docking station according to a third embodiment.

A docking station 1B according to a third embodiment illustrated in FIG. 15 has a configuration similar to that of the docking station 1 according to the first embodiment. Therefore, the docking station 1B according to the present embodiment can also provide advantageous effects similar to those of the first embodiment. In the present embodiment, however, a mark 40B of the docking station 1B is provided as a boundary portion of a plurality of patterns 19 arranged on the surfaces of the housing 10, the first protruding portion 10b, the second protruding portion 10c, and the like of the docking station 1B. In the present embodiment, similarly to the first embodiment, the mark 40B serving as the boundary portion of the patterns 19 extends along the movement direction (connection direction, thrusting direction, inserting direction, fitting direction, or vertical direction) of the electronic device 2 relative to the docking station 1B when the electronic device 2 is supported by (connected to) the docking station 1B. According to the present embodiment, when the patterns 19 are arranged on the docking station 1B, the mark 40B can be provided using the patterns 19. Therefore, for example, it is possible to reduce processing in manufacturing compared with the housing where the mark 40B is provided separately. In the present embodiment, the second protruding portion 10*c* comprises a coil 18 serving as a power feeding module that can feed power to the electronic device 2 wirelessly. The docking stations 1, 1A, and 1B according to the first and the second embodiments, and the present embodiment comprise the second protruding portion 10*c* capable of facing the rear wall 2*e* serving as the wall of the electronic device 2 with a relatively wide area. On the second protruding portion 10*c*, such a power feeding module capable of feeding power wirelessly to the electronic device 2 more efficiently can be provided in a simple manner.

Figure 16:
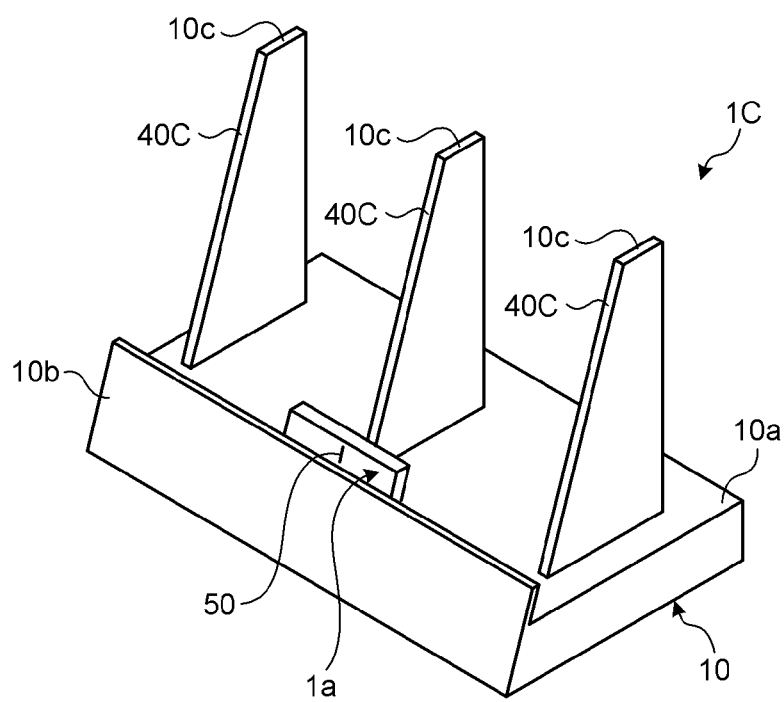
FIG. 16 is an exemplary perspective view of a docking station according to a fourth embodiment.

A docking station 1C according to a fourth embodiment illustrated in FIG. 16 has a configuration similar to that of the docking station 1 according to the first embodiment. Therefore, the docking station 1C according to the present embodiment can also provide advantageous effects similar to those of the first embodiment. In the present embodiment, however, the second protruding portion 10*c* is not a protruding portion in a wall-shape (plat-shape) along the rear surface 2*t*2 of the electronic device 2 arranged at the supporting position (connection position) as in the first to third embodiments. The second protruding portion 10*c* is formed in a wall-shape (plate-shape) along the movement direction of the electronic device 2 relative to the docking station 1C and along a direction intersecting with (for example, orthogonal to) the rear surface 2*t*2. According to the present embodiment, because end edges (end surfaces) 40C of the plurality of second protruding portions 10*c* support the rear wall 2*e* (rear surface 2*t*2) of the electronic device 2, it is possible to reduce resistance when the electronic device 2 is moved, for example. Furthermore, the end surface 40C can be used as the second mark (sign) of the docking station 1C. As a result, for example, it is possible to save the trouble of arranging the second mark separately by printing.

Figure 17:
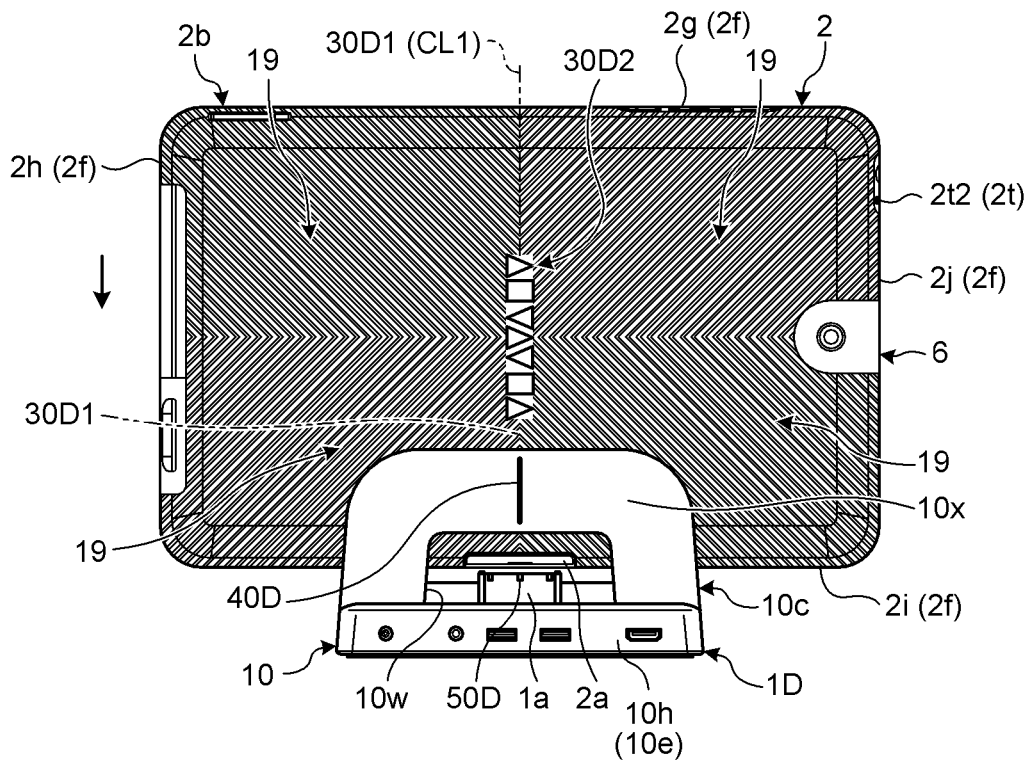
FIG. 17 is an exemplary back view of an electronic device prior to being connected to a docking station according to a fifth embodiment.
Figure 18:
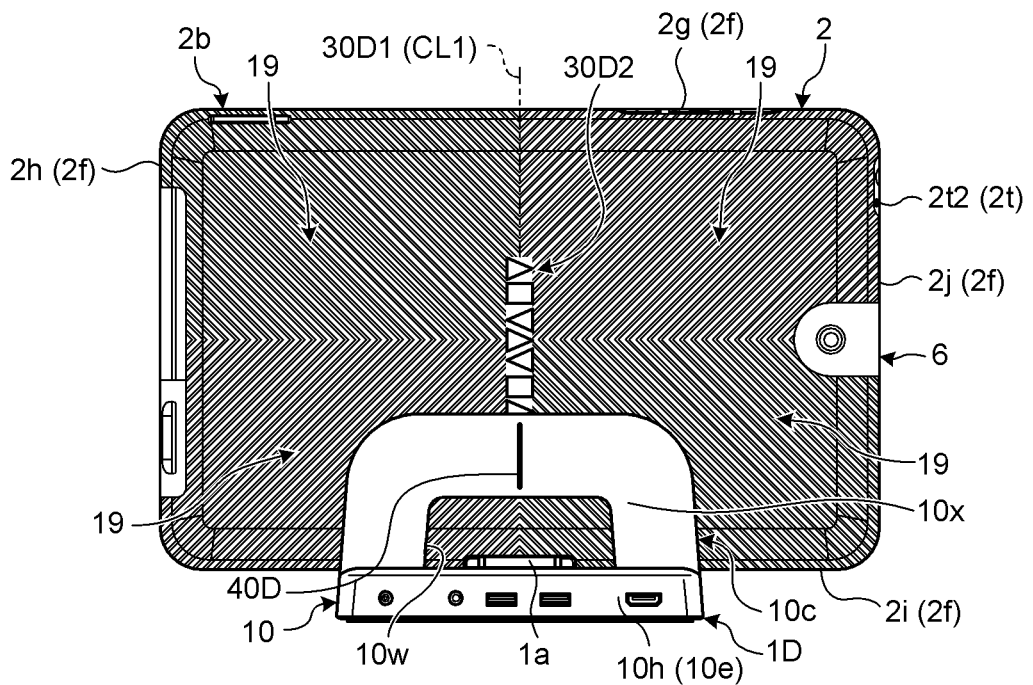
FIG. 18 is an exemplary back view of the electronic device which is connected to the docking station, in the fifth embodiment.

A docking station 1D according to a fifth embodiment illustrated in FIGS. 17 and 18 has a configuration similar to that of the docking station 1 according to the first embodiment. Therefore, the docking station 1D according to the present embodiment can also provide advantageous effects similar to those of the first embodiment. In the present embodiment, however, the electronic device 2 and the docking station 1D can be aligned even if being viewed from the back. In other words, an opening 10*w* is provided on the lower portion of the second protruding portion 10*c*, thereby making it possible to visually confirm the connector 1*a* from the rear of the second protruding portion 10*c*. A mark 50D similar to the mark 50 in the first embodiment is provided to (the rear surface of) the connector 1*a*. On the rear surface 2*t*2 of the electronic device 2, a boundary portion 30D1 of the patterns 19 is provided along the center line CL1 passing through the center of the electronic device 2 in the longitudinal direction and extending in the lateral direction. In addition, on the rear surface 2*t*2, a logo 30D2 is provided along the center line CL1 by printing or the like. Furthermore, a mark 40D in a rod-shape is provided to a rear surface 10*x* of the second protruding portion 10*c* by printing or the like. The boundary portion 30D1 and the logo 30D2 are examples of the first mark and the sign, and the marks 40D and 50D are examples of the second mark and the sign. As is clear from FIGS. 17 and 18, the operator (user or the like) can move the electronic device 2 to the supporting position (connection position or a position illustrated in FIG. 18) in the docking station 1D more simply or more accurately while visually confirming the boundary portion 30D1, the logo 30D2, and the marks 40D and 50D as guides with the boundary portion 30D1 or the logo 30D2, and the mark 40D or the mark 50D aligned along the movement direction (connection direction, thrusting direction, inserting direction, fitting direction, or vertical direction) of the electronic device 2.

Figure 19:
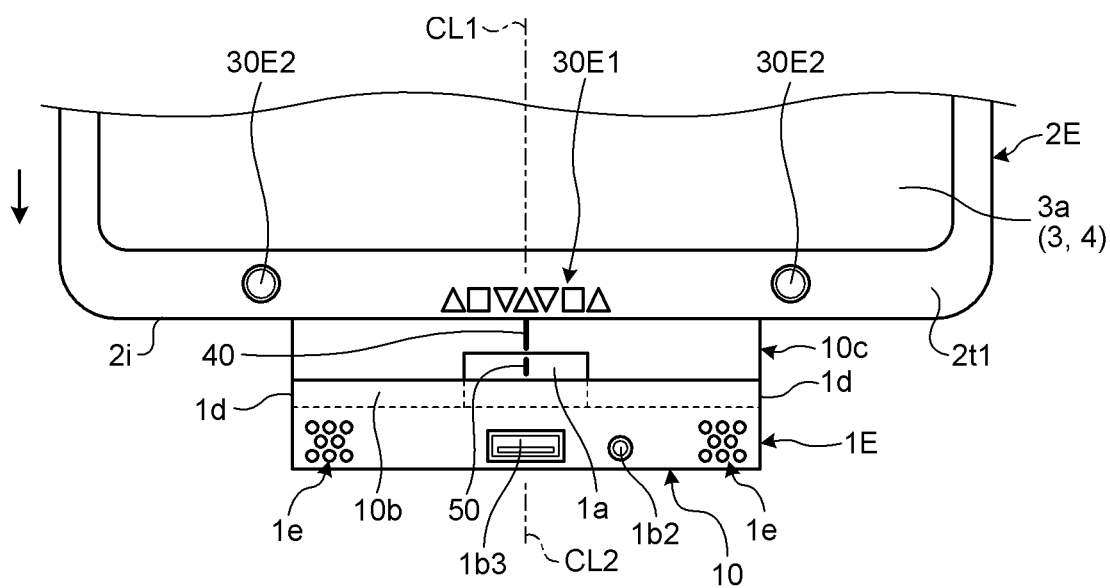
FIG. 19 is an exemplary front view of a portion of an electronic device prior to being connected to a docking station according to a sixth embodiment.

A docking station 1E according to a sixth embodiment illustrated in FIG. 19 has a configuration similar to that of the docking station 1 according to the first embodiment. Therefore, the docking station 1E according to the present embodiment can also provide advantageous effects similar to those of the first embodiment. In the present embodiment, however, a logo 30E1 is provided to the front surface 2*t*1 of the side 2*i* of an electronic device 2E as the first mark. The operator (user or the like) can move the electronic device 2E to the supporting position (connection position) in the docking station 1E more simply or more accurately while aligning the center of the logo 30E1 to the marks 40 and 50. Furthermore, in the present embodiment, a plurality of operation buttons 30E2 serving as functional components are provided to the front surface 2*t*1 of the side 2*i* of the electronic device 2E as the first mark. In this configuration, the operation buttons 30E2 are arranged symmetrically with respect to the center line CL1 passing through the center of the electronic device 2E in the longitudinal direction and extending in the lateral direction. The operation buttons 30E2 are arranged near a side end (end) 1*d* of the docking station 1E viewed from the front. As described above, in the present embodiment, the logo 30E1 and the operation buttons 30E2 serving as functional components (or an area between the operation buttons 30E2) can be used as the first mark (sign).

Furthermore, as illustrated in FIG. 19, speakers 1*e*, the connector for the audio signal 1*b*2, and the connector for data 1*b*3 are provided to the front portion (front surface) of the docking station 1E as functional components. In this configuration, the speakers 1*e* are arranged symmetrically with respect to a center line CL2 passing through the center of the connector 1*a* (center of the logo 30E1 serving as the first mark of the electronic device 2E) and extending along the movement direction (connection direction, thrusting direction, inserting direction, fitting direction, or vertical direction) of the electronic device 2E, and the connector for data 1*b*3 is arranged in a manner aligned to the center line CL2. In other words, in the present embodiment, the speakers 1*e* (or an area between the speakers 1*e*) and the connector for data 1*b*3 serving as functional components can be used as the second mark (sign).

Figure 20:
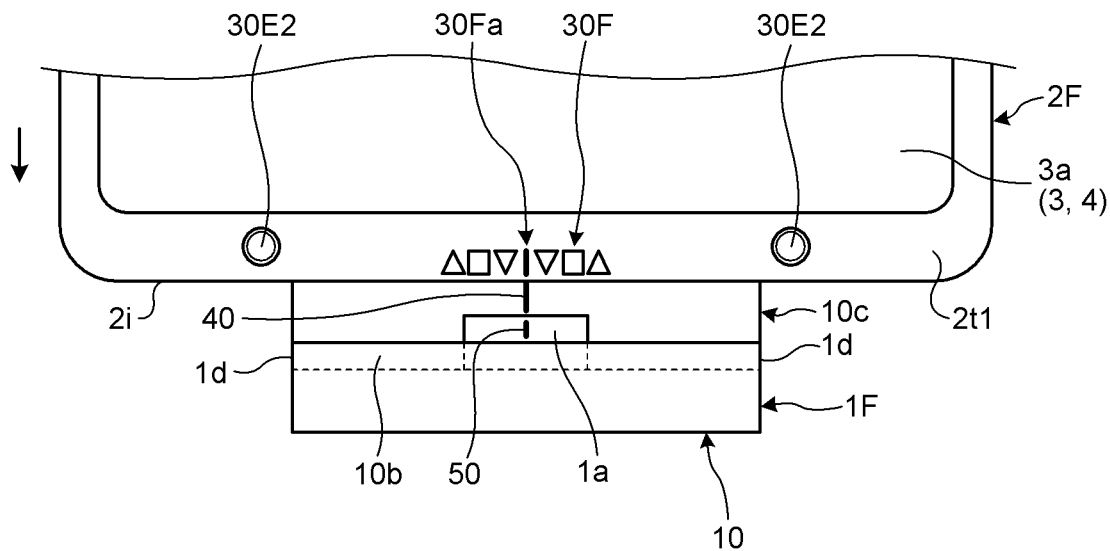
FIG. 20 is an exemplary front view of a portion of an electronic device prior to being connected to a docking station according to a seventh embodiment.

A docking station 1F according to a seventh embodiment illustrated in FIG. 20 has a configuration similar to that of the docking station 1 according to the first embodiment. Therefore, the docking station 1F according to the present embodiment can also provide advantageous effects similar to those of the first embodiment. In the present embodiment, similarly to the sixth embodiment, a logo 30F is used as the first mark (sign). In the present embodiment, similarly to the sixth embodiment, the logo 30F is provided to the front surface 2*t*1 of the side 2*i* of an electronic device 2F. In the present embodiment, however, characters in the logo 30F contain an element (e.g., a character and a figure, such as "I") 30Fa capable of indicating a specific position (e.g., a position corresponding to the second mark). Therefore, the operator (user or the like) can perform alignment still more simply by using the element 30Fa.

Figure 21:
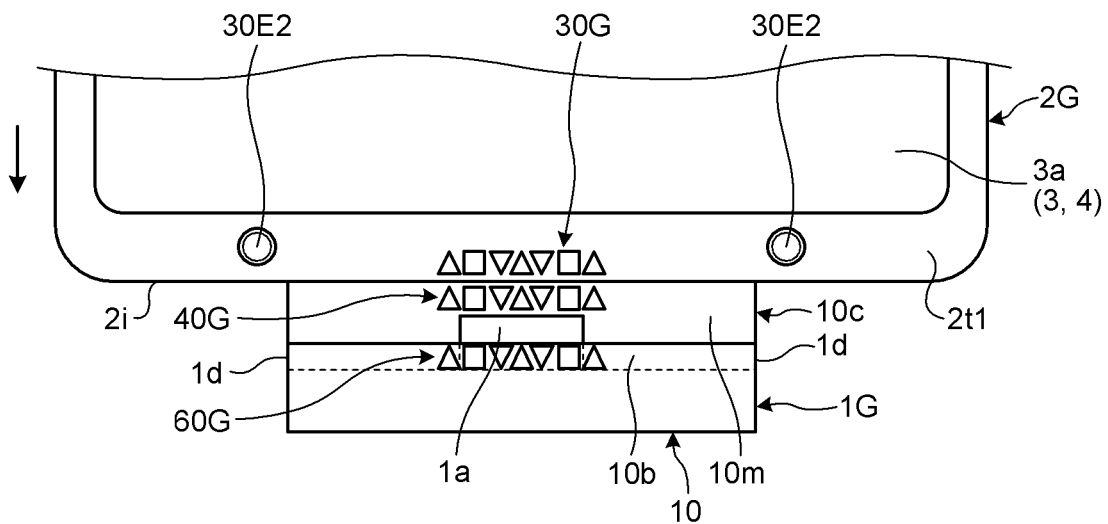
FIG. 21 is an exemplary front view of a portion of an electronic device prior to being connected to a docking station according to an eighth embodiment.
Figure 22:
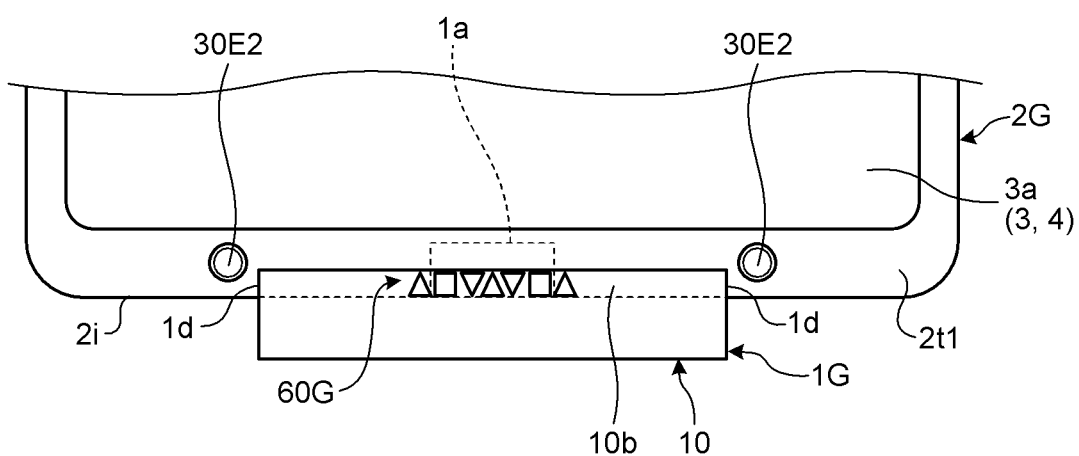
FIG. 22 is an exemplary front view of a portion of the electronic device which is connected to the docking station in the eighth embodiment.

A docking station 1G according to an eighth embodiment illustrated in FIGS. 21 and 22 has a configuration similar to that of the docking station 1 according to the first embodiment. Therefore, the docking station 1G according to the present embodiment can also provide advantageous effects similar to those of the first embodiment. In the present embodiment, however, an electronic device 2G comprises a logo 30G as the first mark (sign), and the docking station 1G comprises logos 40G and 60G as the second mark (sign). In the present embodiment, similarly to the sixth embodiment and the seventh embodiment, the logo 30G is provided to the front surface 2t1 of the side 2i of the electronic device 2G. The logo 40G is provided to the front surface 10m of the second protruding portion 10c, and the logo 60G is provided to the front portion of the first protruding portion 10b. As illustrated in FIG. 21, the logos 30G, 40G, and 60G are arranged in a manner aligned along the movement direction (connection direction, thrusting direction, inserting direction, fitting direction, or vertical direction) of the electronic device 2G viewed from the front. Therefore, the operator (user or the like) can move the electronic device 2G to the supporting position (connection position or a position illustrated in FIG. 22) in the docking station 1G more simply or more accurately while visually confirming the logos 30G, 40G, and 60G as guides with the logos 30G, 40G, and 60G aligned along the movement direction (connection direction, thrusting direction, inserting direction, fitting direction, or vertical direction) of the electronic device 2G.

Figure 23:
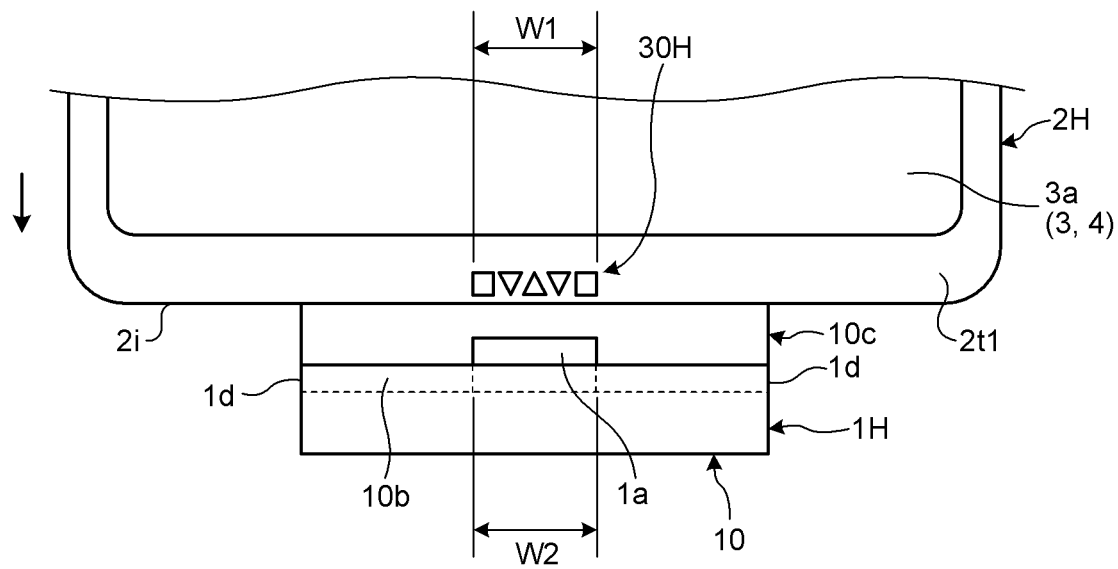
FIG. 23 is an exemplary front view of a portion of an electronic device prior to being connected to a docking station according to a ninth embodiment.

A docking station 1H according to a ninth embodiment illustrated in FIG. 23 has a configuration similar to that of the docking station 1 according to the first embodiment. Therefore, the docking station 1H according to the present embodiment can also provide advantageous effects similar to those of the first embodiment. In the present embodiment, similarly to the sixth to eighth embodiments, a logo 30H is used as the first mark (sign). In the present embodiment, however, a width W1 of the logo 30H corresponds to a width W2 of the connector 1a viewed from the front. Therefore, the operator (user or the like) can move an electronic device 2H to the supporting position (connection position) in the docking station 1H more simply or more accurately while visually confirming the logo 30H as a guide with the logo 30H and the connector 1a aligned along the movement direction (connection direction, thrusting direction, inserting direction, fitting direction, or vertical direction) of the electronic device 2H.

Figure 24:
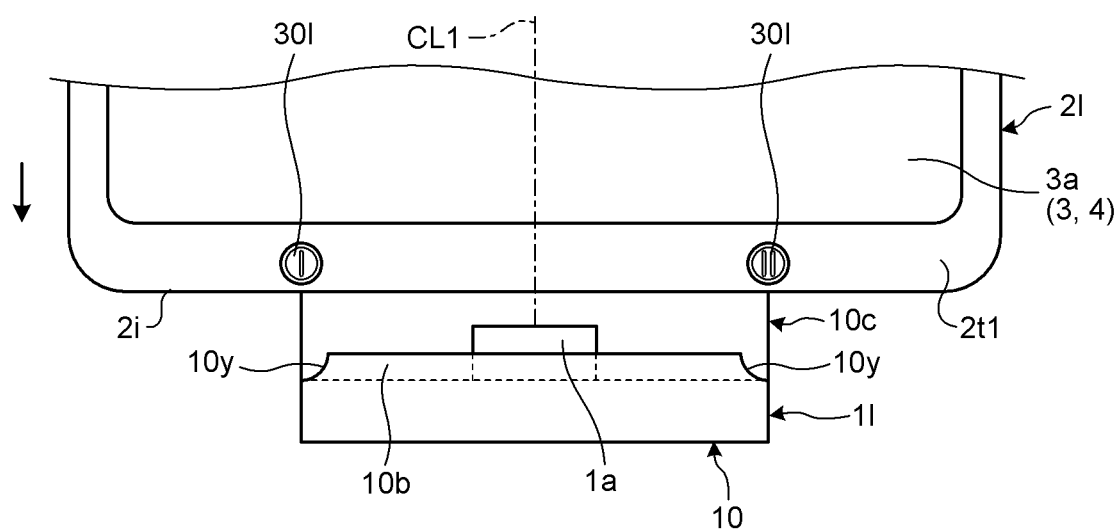
FIG. 24 is an exemplary front view of a portion of an electronic device prior to being connected to a docking station according to a tenth embodiment.
Figure 25:
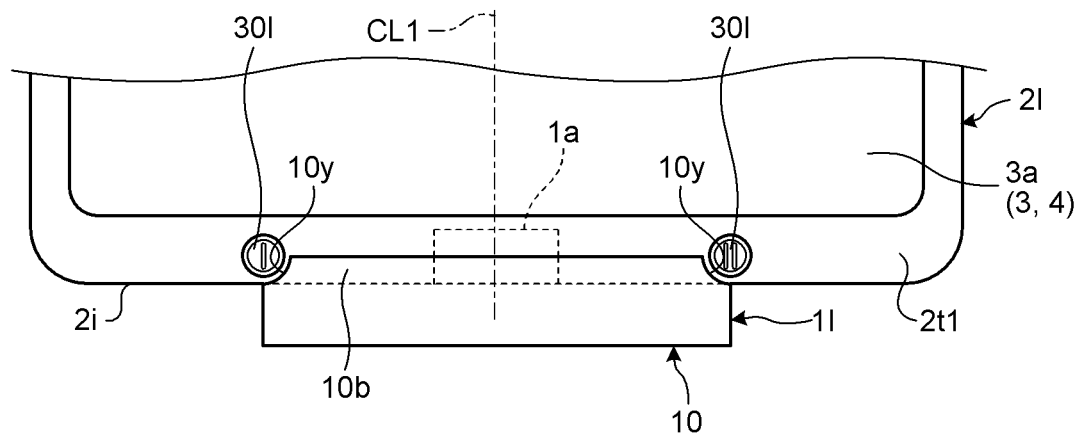
FIG. 25 is an exemplary front view of a portion of the electronic device which is connected to the docking station, in the tenth embodiment.

A docking station 1I according to a tenth embodiment illustrated in FIGS. 24 and 25 has a configuration similar to that of the docking station 1 according to the first embodiment. Therefore, the docking station 1I according to the present embodiment can also provide advantageous effects similar to those of the first embodiment. In the present embodiment, however, a plurality of operation buttons 30I serving as functional components are used as the first mark (sign). In this configuration, the operation buttons 30I are arranged symmetrically with respect to the center line CL1 passing through the center of an electronic device 2I in the longitudinal direction and extending in the lateral direction. In the present embodiment, as illustrated in FIG. 24, the operator (user or the like) can move the electronic device 2I to the supporting position (connection position) in the docking station 1I more simply or more accurately while aligning the operation buttons 30I to the side ends (ends) 1d of the docking station 1I. In the present embodiment, as illustrated in FIG. 25, while the electronic device 2I is supported by (connected to) the docking station 1I, the operation button 30I is exposed through a notch 10y provided to the first protruding portion 10b of the docking station 1I. Therefore, in the present embodiment, the operation button 30I can be used even in the state where the electronic device 2I is supported by (connected to) the docking station 1I.

The electronic device capable of being supported or held by the docking station is not limited to the electronic devices disclosed in the embodiments. The present embodiments can be applied to a smartphone, a smartbook, a mobile phone, a folding electronic device, and a module, for example. Furthermore, the docking station can be used for electronic devices of a plurality of types and in a plurality of sizes in common.

The mark or the sign needs only to be visually confirmed as a dot, a line, an area, a shape, a boundary between areas or shapes, and the like, and is not limited to the marks or the signs disclosed in the embodiments. The mark or the sign can be formed, for example, as a mark or a sign visually discriminated by a convex-concave shape, such as a projection, a convex portion, a concave portion, a through hole, and a slit, or optical properties, such as a color, a luster, roughness, reflectivity, a refractive index, transmittance, and diffusivity, and differences thereof. Furthermore, a light-emitting element, a luminous body, a light-emitting module, and the like can be used as the mark or the sign.

Figure 26:
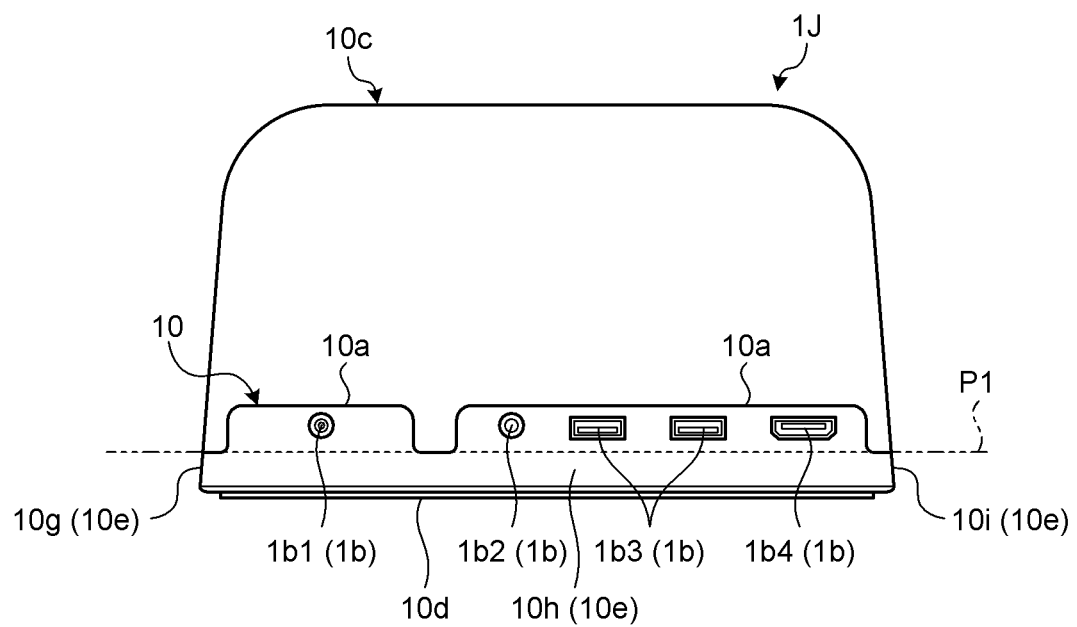
FIG. 26 is an exemplary back view of a docking station according to a modification of the first embodiment.

As in a modification of the first embodiment illustrated in FIG. 26, for example, a supporting position P1 for the electronic device 2 in a docking station 1J can be different from the position of the upper wall 10a of the housing 10. This configuration can make the housing 10 of the docking station 1J thinner.

Figure 27:
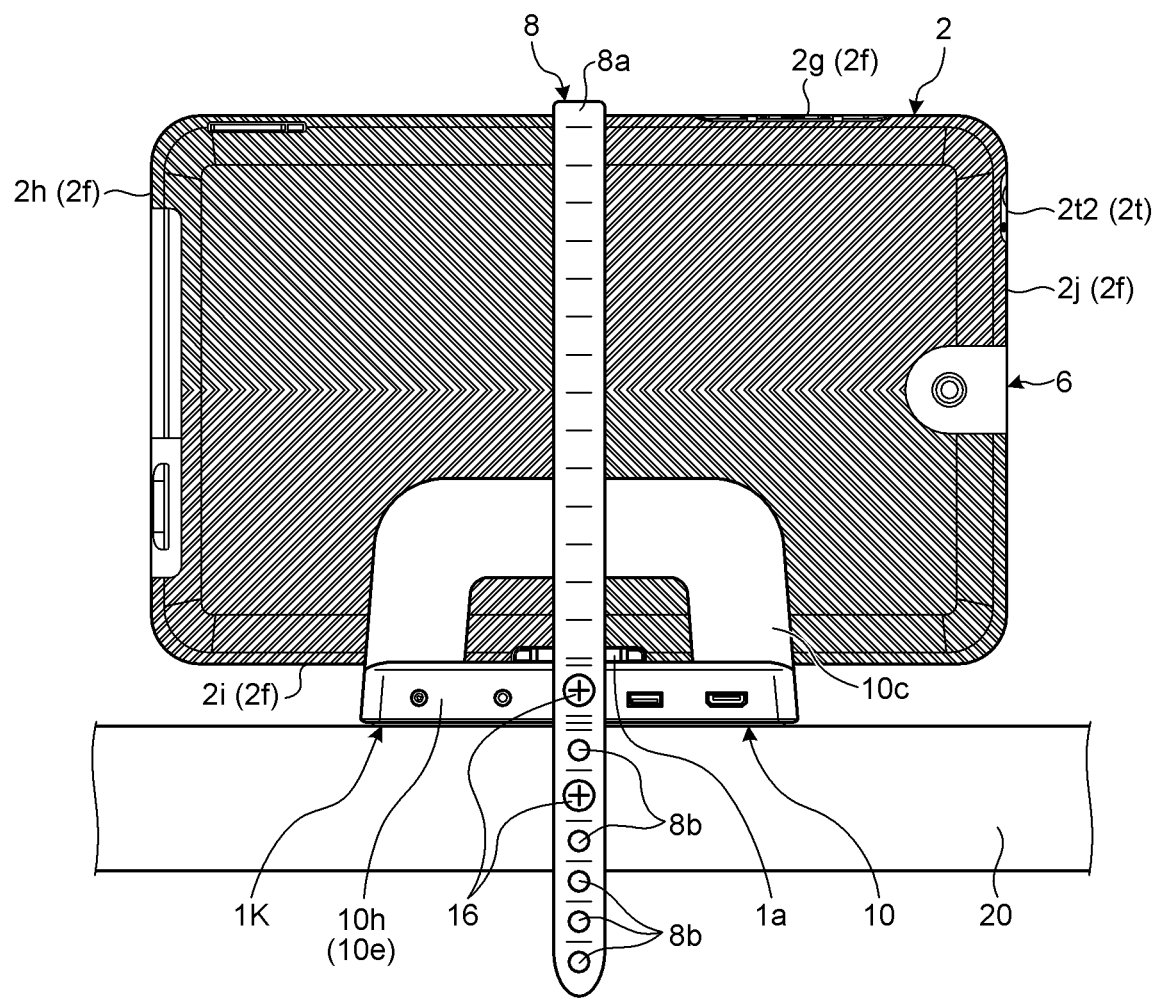
FIG. 27 is an exemplary back view of the electronic device which is connected to a docking station according to a modification of the fifth embodiment.

As in a modification of the fifth embodiment illustrated in FIG. 27, for example, a docking station 1K can comprise a fixing member 8. The fixing member 8 is, for example, a strap formed of a synthetic resin material having flexibility. On one end of the fixing member 8, a hook 8a serving as an engaging portion (first fixing portion) that engages with an upper end of the electronic device 2 supported by the docking station 1K is provided. By contrast, on the other end of the fixing member 8, through holes 8b serving as a second fixing portion used for passing a fixture such as the screw 16 through another portion of a setting stand 20 or the like on which the docking station 1K is placed are provided. The positions between one end (first fixing portion) and the other end (second fixing portion) of the fixing member 8 are fixed to the housing 10 with the screws 16. This configuration allows the electronic device 2 to be supported stably by the docking station 1K. The fixing member 8 needs only to have a structure capable of fixing the docking station 1K to an external member, or supporting the docking station 1K not to be misaligned, and may be a suction cup or a double-sided adhesive tape, for example. Furthermore, the fixing member 8 may be not an external member, but an opening that is provided to the docking station 1K and through which the screw is passed, for example.

The docking station and the electronic device can have a structure in which at least a part thereof is made transparent (made translucent). This makes it possible to increase visibility of the connector and the mark, for example, and to align the docking station and the electronic device more simply. In particular, the docking station preferably has a structure in which at least a part of the first protruding portion serving as the cover and the second protruding portion serving as the first support is made transparent.

The electronic device, the docking station, the housing, the display device, the sign, the first mark, the second mark, the first face, the second face, the side portion, the first connector, the second connector, the first support, the second support, the third support, the cover, the pattern, the functional component, the area between the functional components, the external device, and the like can be provided with specifications (a structure, a type, a direction, a shape, a size, a length, a width, a thickness, a height, number, an arrangement, a position, a material, and the like) changed as appropriate.

According to the embodiments, for example, a docking station (an electronic device) with which another electronic device can be moved to a predetermined position of the docking station more simply or more accurately can be provided. The structure capable of connecting the connectors of two of the electronic devices disclosed in this specification is not limited to the embodiments that illustrate the combinations of the docking stations and the electronic devices. The structure can be suitably applied to various types of devices and mechanisms (e.g., a supporting stand having no function as a function expansion device, a recharger, a cradle of a mobile phone, a supporting stand of a mobile phone or a television, a mechanism supporting an external device, and a mechanism connecting an external device).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A docking station comprising:
    a first support configured to support an electronic device, the electronic device comprising: a housing configured to house a display comprising a display screen; a first face comprising a first mark indicating a position at which the housing is connected to the docking station; a second face on an opposite side of the first face; a side portion between the first face and the second face; and an electronic device connector on the side portion, wherein the first support is configured to support the second face of the electronic device such that the display screen is inclined;
    a second support configured to support the side portion of the electronic device such that the display screen is inclined;
    a docking station connector, protruding outward from the second support, configured to connect to the electronic device connector of the electronic device;
    a cover configured to cover at least a part of the first face; and
    a second mark corresponding to the first mark, the second mark guidably indicating the position at which the electronic device is connected to the docking station,
    wherein:
        the docking station connector protrudes higher than the cover,
        the first support comprises the second mark, and
        the second mark comprises a part extending in a direction of connection of the electronic device connector and the docking station connector at a position above the docking station connector when the part is viewed in a direction facing the first face of the electronic device while the electronic device is supported by the docking station.

2. The docking station of claim 1, wherein at least one of the first mark and the second mark forms at least a part of a logo.

3. The docking station of claim 1, wherein the second docking station connector comprises the second mark.

4. The docking station of claim 1, wherein at least one of the first mark and the second mark comprises a boundary portion of a pattern.

5. The docking station of claim 1, wherein at least one of the first mark and the second mark comprises a functional component.

6. The docking station of claim 1, wherein at least one of the first mark and the second mark comprises a plurality of functional components or an area between the functional components.

7. An electronic device comprising:
    a first support configured to support a second face of a second electronic device, the second electronic device comprising: a first face comprising a display screen and a first mark; the second face on an opposite side of the first face; a side portion between the first face and the second face; and an electronic device connector on the side portion, the first support comprising a second mark corresponding to the first mark;
    a second support from which a docking station connector, configured to connect to the electronic device connector in a state corresponding to the first mark, protrudes, the second support configured to support the side portion; and
    a cover configured to cover at least a part of the first face, wherein:
        the docking station connector protrudes higher than the cover, and
        the second mark comprises a part extending in a direction of connection of the electronic device connector and the docking station connector at a position above the docking station connector when the part is viewed in a direction facing the first face of the other electronic device while the other electronic device is supported by the electronic device.

8. An electronic device comprising:
    a first support configured to support a back face of an external device comprising an electronic device connector on a side portion thereof;
    a docking station connector configured to connect to the electronic device connector of the external device;
    a mark configured to indicate a position of the external device in a state in which the electronic device connector and the docking station connector are connected with each other; and
    a cover configured to cover at least a part of a front face of the external device,
    wherein:
        the docking station connector protrudes higher than the cover, and
        the mark comprises a part extending in a direction of connection of the electronic device connector and the docking station connector at a position above the docking station connector when the part is viewed in a direction facing the first face of the external device.

* * * * *